US012536126B2

(12) United States Patent
Kale et al.

(10) Patent No.: US 12,536,126 B2
(45) Date of Patent: Jan. 27, 2026

(54) INTELLIGENT IMAGE SENSOR STACK

(71) Applicant: Micron Technology, Inc., Boise, ID (US)

(72) Inventors: Poorna Kale, Folsom, CA (US); Amit Gattani, Granite Bay, CA (US)

(73) Assignee: Micron Technology, Inc., Boise, ID (US)

( * ) Notice: Subject to any disclaimer, the term of this patent is extended or adjusted under 35 U.S.C. 154(b) by 986 days.

(21) Appl. No.: 17/074,410

(22) Filed: Oct. 19, 2020

(65) Prior Publication Data
US 2021/0142146 A1 May 13, 2021

Related U.S. Application Data

(60) Provisional application No. 62/934,635, filed on Nov. 13, 2019.

(51) Int. Cl.
*G06F 13/42* (2006.01)
*G06F 9/38* (2018.01)
(Continued)

(52) U.S. Cl.
CPC ........ *G06F 13/4282* (2013.01); *G06F 9/3836* (2013.01); *G06F 12/0253* (2013.01);
(Continued)

(58) Field of Classification Search
CPC ............... G06F 13/4282; G06F 9/3836; G06F 12/0253; G06F 12/0207; G06N 3/049; G06N 3/08; G06N 3/048; G06N 3/063; G06V 10/764; G06V 10/82; G06V 10/95; G06V 10/955; G06V 20/56; B60W 60/00
See application file for complete search history.

(56) References Cited

U.S. PATENT DOCUMENTS

2009/0141146 A1 6/2009 Guidash
2013/0236882 A1 9/2013 Yu et al.
(Continued)

OTHER PUBLICATIONS

Eung Chang Lee, et al. "Thermal Analysis of Ball Grid Array Non-Volatile Memory Express Solid-State Drive in Vacuum," IEEE Electron Device Letters, IEEE, Dec. 1, 2018. (Year: 2018).*
(Continued)

*Primary Examiner* — Van D Huynh
(74) *Attorney, Agent, or Firm* — Greenberg Traurig

(57) ABSTRACT

An integrated circuit device in a single integrated circuit package, having an image sensor, memory, and an inference engine configured to convert images generated by the image sensor into inference results for transmitting to a host system for further analysis and/or generate a more efficient image stream provided in the camera interface. The intelligence provided by the inference engine can reduce or eliminate the amount of image data transmitted to the host system for processing during a typical scenario. The inference results can be automatically stored in the memory accessible by the host system as a solid state drive (e.g., using a NVMe protocol). Optionally, the integrated circuit device can have an interface to an external SSD. For example, the integrated circuit device as an SSD and/or the external SSD can be configured as a black box data recorder of an autonomous vehicle.

23 Claims, 14 Drawing Sheets

(51) Int. Cl.

| | | |
|---|---|---|
| *G06F 12/02* | (2006.01) | |
| *G06N 3/049* | (2023.01) | |
| *G06N 3/08* | (2023.01) | |
| *G06V 10/764* | (2022.01) | |
| *G06V 10/82* | (2022.01) | |
| *G06V 10/94* | (2022.01) | |
| *G06V 20/56* | (2022.01) | |
| *B60W 60/00* | (2020.01) | |

(52) U.S. Cl.
CPC .............. *G06N 3/049* (2013.01); *G06N 3/08* (2013.01); *G06V 10/764* (2022.01); *G06V 10/82* (2022.01); *G06V 10/95* (2022.01); *G06V 10/955* (2022.01); *G06V 20/56* (2022.01); *B60W 60/00* (2020.02)

(56) References Cited

U.S. PATENT DOCUMENTS

| | | | |
|---|---|---|---|
| 2014/0015995 A1 | 1/2014 | Campbell | |
| 2015/0113214 A1* | 4/2015 | Sutardja | G06F 3/0638 711/106 |
| 2015/0187388 A1* | 7/2015 | Andrysco | H04N 5/765 386/248 |
| 2015/0256725 A1* | 9/2015 | Jiang | H04N 23/57 348/373 |
| 2018/0191993 A1* | 7/2018 | Gera | H04N 23/65 |
| 2019/0302766 A1* | 10/2019 | Mondello | G06F 21/64 |
| 2019/0304111 A1* | 10/2019 | Zatzarinni | G06T 5/50 |
| 2019/0317901 A1* | 10/2019 | Kachare | G06F 3/0679 |
| 2019/0340501 A1* | 11/2019 | Mills | G06N 3/0464 |
| 2020/0042549 A1* | 2/2020 | Mizrahi | G06F 3/068 |
| 2020/0077066 A1* | 3/2020 | Cao | H04N 23/951 |
| 2020/0342579 A1* | 10/2020 | Lin | G06T 5/70 |

OTHER PUBLICATIONS

Eung Chang Lee, et al. "Thermal Analysis of Ball Grid Array Non-Volatile Memory Express Solid-State Drive in Vacuum," IEEE Electron Device Letters, IEEE, Dec. 1, 2018.

International Search Report and Written Opinion, PCT/US2020/058695, mailed on Feb. 17, 2021.

Vikram Sharma Mailthody, et al. "DeepStore In-Storage Acceleration for Intelligent Queries," Proceedings of the 52nd Annual IEEE/ACM International Symposium on Microarchitecture, Micro '52, ACM Press, Oct. 12, 2019.

* cited by examiner

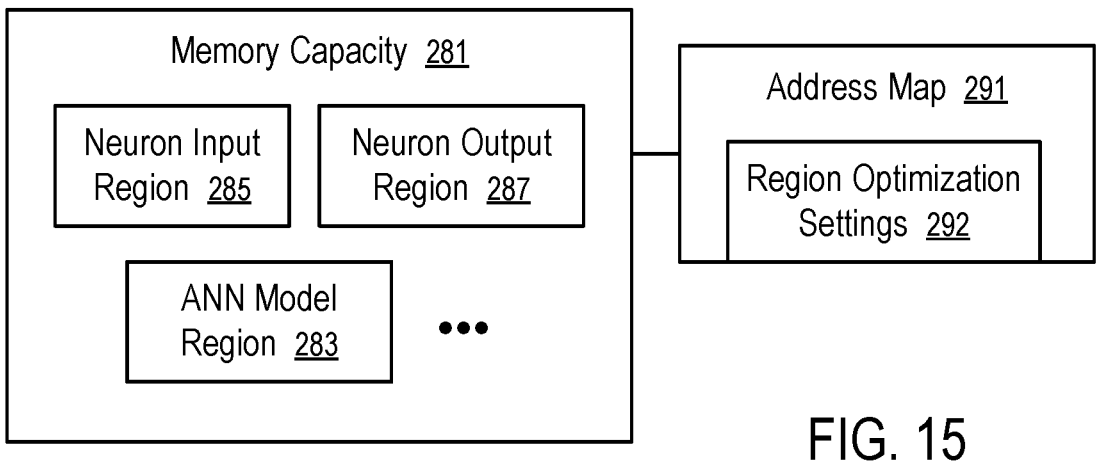
FIG. 15
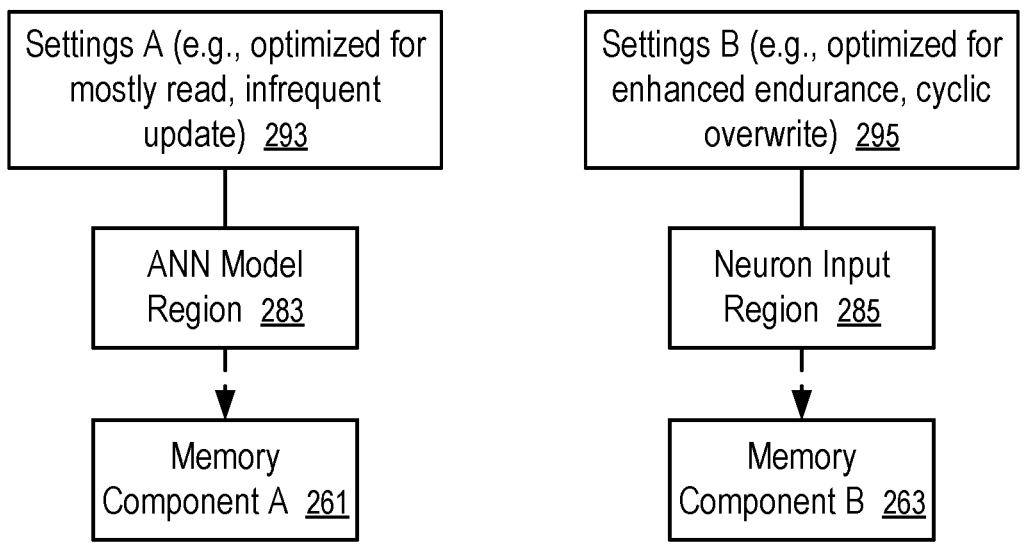
FIG. 16
FIG. 17
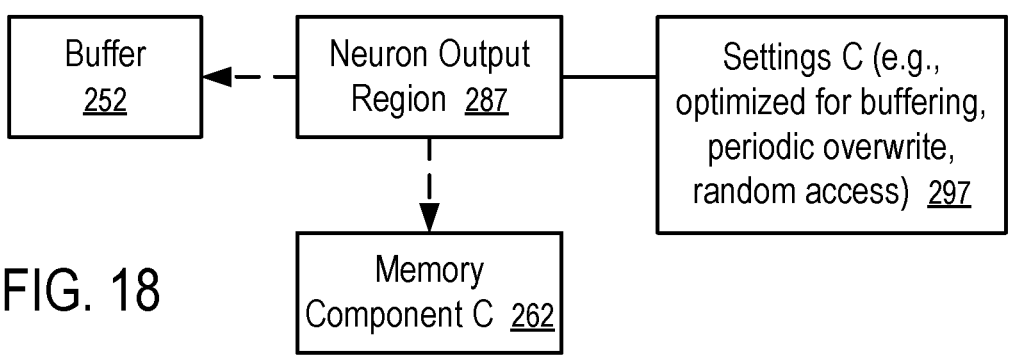
FIG. 18

INTELLIGENT IMAGE SENSOR STACK

RELATED APPLICATIONS

The Present Application claims the benefit of the filing date of Prov. U.S. Pat. App. Ser. No. 62/934,635, filed Nov. 13, 2019 and entitled "Intelligent Image Sensor Stack," the entire disclosure of which application is thereby incorporated herein by reference.

FIELD OF THE TECHNOLOGY

At least some embodiments disclosed herein relate to integrated circuit for image sensing in general and more particularly, but not limited to, intelligent image sensors with processing logic.

BACKGROUND

Recent developments in the technological area of autonomous driving allow a computing system to operate, at least under some conditions, control elements of a motor vehicle without the assistance from a human operator of the vehicle.

For example, sensors (e.g., cameras and radars) can be installed on a motor vehicle to detect the conditions of the surroundings of the vehicle traveling on a roadway. A computing system installed on the vehicle analyzes the sensor inputs to identify the conditions and generate control signals or commands for the autonomous adjustments of the direction and/or speed of the vehicle, with or without any input from a human operator of the vehicle.

In some arrangements, when a computing system recognizes a situation where the computing system may not be able to continue operating the vehicle in a safe manner, the computing system alerts the human operator of the vehicle and requests the human operator to take over the control of the vehicle and drive manually, instead of allowing the computing system to drive the vehicle autonomously.

Autonomous driving and/or Advanced Driver Assistance System (ADAS) can use an Artificial Neural Network (ANN) for the identification of events and/or objects that are captured in sensor inputs. Examples of sensor inputs include images from digital cameras, lidars, radars, ultrasound sonars, etc.

In general, an Artificial Neural Network (ANN) uses a network of neurons to process inputs to the network and to generate outputs from the network.

For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the network, as well as the bias, activation function, and synaptic weights of each neuron. Using a given ANN model a computing device computes the output(s) of the network from a given set of inputs to the network.

For example, the inputs to an ANN network may be generated based on camera inputs; and the outputs from the ANN network may be the identification of an item, such as an event or an object.

A Spiking Neural Network (SNN) is a type of ANN that closely mimics natural neural networks. An SNN neuron produces a spike as output when the activation level of the neuron is sufficiently high. The activation level of an SNN neuron mimics the membrane potential of a natural neuron. The outputs/spikes of the SNN neurons can change the activation levels of other neurons that receive the outputs. The current activation level of an SNN neuron as a function of time is typically modeled using a differential equation and considered the state of the SNN neuron. Incoming spikes from other neurons can push the activation level of the neuron higher to reach a threshold for spiking. Once the neuron spikes, its activation level is reset. Before the spiking, the activation level of the SNN neuron can decay over time, as controlled by the differential equation. The element of time in the behavior of SNN neurons makes an SNN suitable for processing spatiotemporal data. The connectivity of SNN is often sparse, which is advantageous in reducing computational workload.

In general, an ANN may be trained using a supervised method where the parameters in the ANN are adjusted to minimize or reduce the error between known outputs resulted from respective inputs and computed outputs generated from applying the inputs to the ANN. Examples of supervised learning/training methods include reinforcement learning, and learning with error correction.

Alternatively, or in combination, an ANN may be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

BRIEF DESCRIPTION OF THE DRAWINGS

The embodiments are illustrated by way of example and not limitation in the figures of the accompanying drawings in which like references indicate similar elements.

FIG. 15 shows a memory capacity configured to support neural network computations according to one embodiment.

FIG. 16 illustrates the configuration of a memory region for an Artificial Neural Network (ANN) model according to one embodiment.

FIG. 17 illustrates the configuration of a memory region for the inputs to artificial neurons according to one embodiment.

FIG. 18 illustrates the configuration of a memory region for the outputs from artificial neurons according to one embodiment.

DETAILED DESCRIPTION

At least some embodiments disclosed herein provide integrated circuit devices having image sensing elements, memory, and processing logic circuit configured to perform image signal processing and/or for Artificial Intelligence (AI) calculations.

Figure 1:
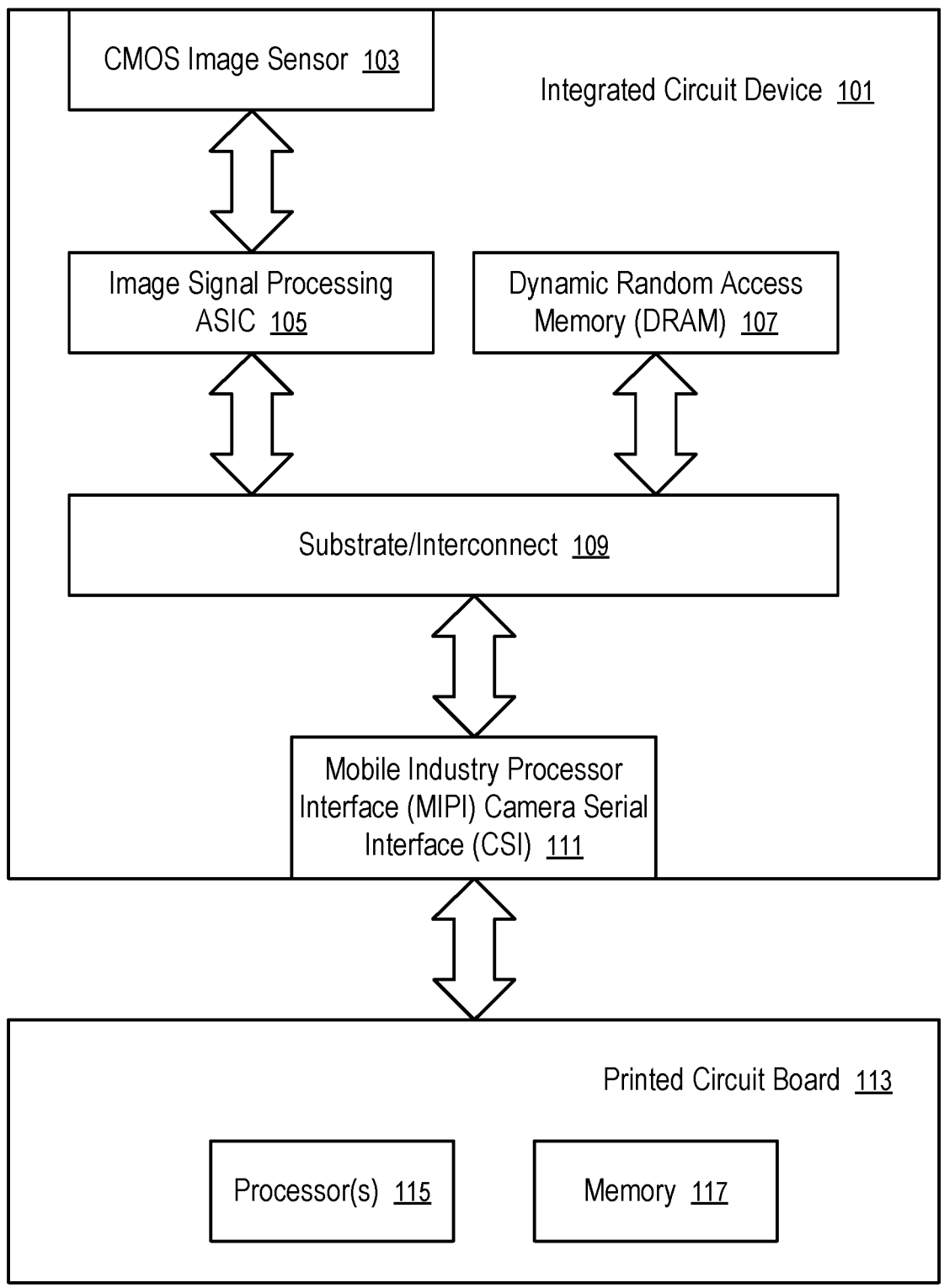
FIG. 1 shows an integrated circuit device having an image sensor, an image signal processing circuit, and random access memory according to one embodiment.

FIG. 1 shows an Integrated Circuit (IC) device (101) having a CMOS (Complementary Metal-Oxide-Semiconductor) image sensor (103), an Image Signal Processing (ISP) Application-Specific Integrated Circuit (ASIC) (105), and Dynamic Random Access Memory (DRAM) (107) according to one embodiment. The components of the integrated circuit device (101) are packaged within a single integrated circuit package.

The CMOS image sensor (103) includes an array of light sensing elements. Different light sensing elements are configured to generate signals for different pixels of an image captured by the image sensor (103). The image signals generated by the light sensing elements are processed by the ISP ASIC to generate digital data representing an image captured via the image sensor (103).

The CMOS image sensor (103) and the ISP ASIC (105) can be formed in different layers of an integrated circuit die. Alternatively, the CMOS image sensor (103) and the ISP ASIC (105) can be formed on different integrated circuit dies that are connected within the package of the integrated circuit device (101) (e.g., via wires or Through-Silicon Vias (TSVs)).

The DRAM (107) has a set of memory cells formed on an integrated circuit die that is separated from the integrated circuit die(s) of the ISP ASIC (105) and/or the image sensor (103). Alternatively, the DRAM (107) and the ISP ASIC (105) can be formed on different areas of a same integrated circuit die.

The integrated circuit device (101) includes a substrate (109) that provides high-bandwidth interconnect between the ISP ASIC (105) and the DRAM (107). The DRAM (107) provides storage capacity for the ISP ASIC (105) such that the ISP ASIC (105) can be configured to perform advanced image processing that is beyond the conversion of analog signals to digital image data and limited image signal cleaning. Using the high-bandwidth, low-energy connection between the ISP ASIC (105) and the DRAM (107) provided by the substrate/interconnect (109), the ISP ASIC (105) can use the DRAM (107) to store intermediate processing results and perform image processing on a block of nearby pixels to generate an output for each pixel.

For example, the ISP ASIC (105) can be configured to perform advanced image cleaning and enhancing operations, such as warping detection and correction, color correction, deblurring, noise reduction, etc.

Optionally, the integrated circuit device (101) can be partitioned into multiple sections. Each section can include a sub-array of light sensing elements of the image sensor (103), an ISP circuit, and a sub-set of DRAM memory cells. The different sections can be configured to operate in parallel to process the pixels within respective sections to generate intermediate results.

Further, the ISP ASIC (105) can be configured to operate on the intermediate results across the section boundaries to perform advanced image processing globally, e.g., for warping detection and correction, color correction, deblurring, noise reduction, etc.

For example, the output of a pixel can be generated based on a collection of pixels containing the pixel. The collection can be selected or constructed such that the pixel is substantially at the center of the section.

For example, an initial image as captured by the image sensor (103) can be processed on a per-pixel basis by the ISP ASIC (105) to generate a version of an image stored in the DRAM. Subsequently, for each pixel, a set of neighboring pixels are selected for further processing, e.g., for warping detection and correction, color correction, deblurring, or noise reduction, etc. to generate a next version of the image stored in the DRAM. Different processing iterations can be configured to enhance different aspects of the image. Optionally, a global analysis of all pixels in the image can be performed for an enhancement or correction (e.g., for warping detection).

Optionally, different image processing/enhancing/correction options can be selectively applied. Thus, the integrated circuit device (101) can be configured to apply different image processing options based on preferences, response time, output resolution, etc.

The integrated circuit device (101) can include a Mobile Industry Processor Interface (MIPI) Camera Serial Interface (CSI) (111) for connection to a host system. For example, the host system can include one or more processors (115) and memory (117) configured on a printed circuit board (113). In some instances, the processor(s) (115) and the memory (117) are configured in a System on Chip (SoC).

Figure 2:
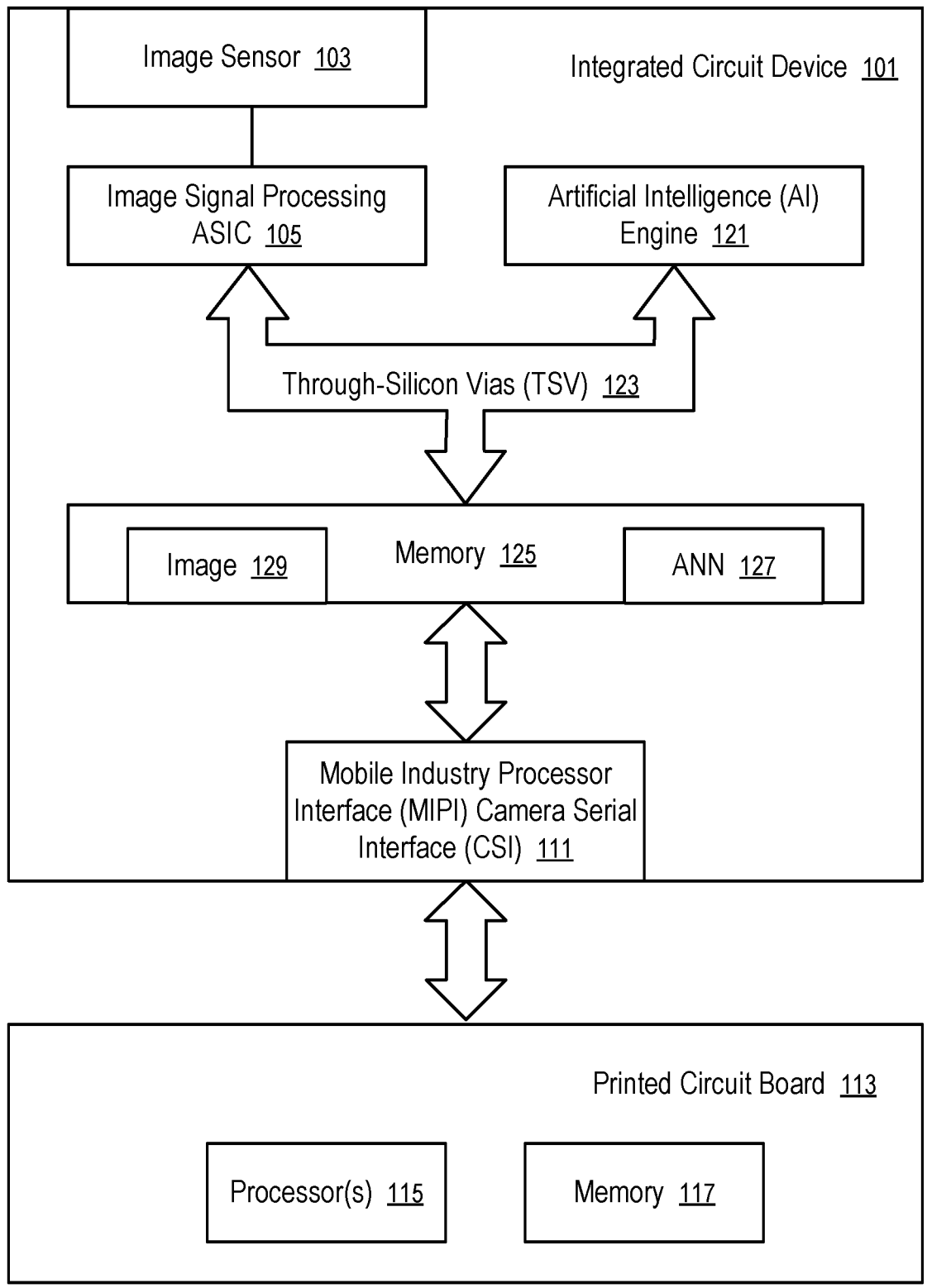
FIG. 2 shows an integrated circuit device having an image sensor and an Artificial Intelligence (AI) engine according to one embodiment.

FIG. 2 shows an integrated circuit device (101) having an image sensor (103) and an Artificial Intelligence (AI) engine (121) according to one embodiment. The components of the integrated circuit device (101) are packaged within a single integrated circuit package.

The image sensor (103) and the ISP ASIC (105) of the integrated circuit device (101) of FIG. 2 can be similar to those in FIG. 1.

In FIG. 2, the AI engine (121) is connected via Through-Silicon Vias (TSV) (123) to the memory (125). The AI engine (121) is configured to process images that have been corrected and/or enhanced by the ASIC (105) for advanced image processing based on an Artificial Neural Network (ANN) (127) stored in the memory (125).

For example, the ANN (127) can be used to detect warping, deblurring, or noises that can be further corrected by the image signal processing ASIC (105).

For example, the ANN (127) can be used to identify a portion of image of interest; and the ISP ASIC (105) is configured to further enhance or correct the identified portion.

The resulting image (129), enhanced via both the ISP ASIC (105) and the AI engine (121), can be provided by the integrated circuit device (101) to the host system (e.g., processor(s) (115) on the printed circuit board (113)) via the MIPI CSI (111).

In general, the memory (125) can include volatile memory (e.g., DRAM (107)) and/or non-volatile memory.

Examples of non-volatile memory include flash memory, memory units formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two layers of wires running in perpendicular directions, where wires of one layer run in one direction in the layer is located above the memory element columns, and wires of the other layer is in another direction and in the layer located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

Figure 3:
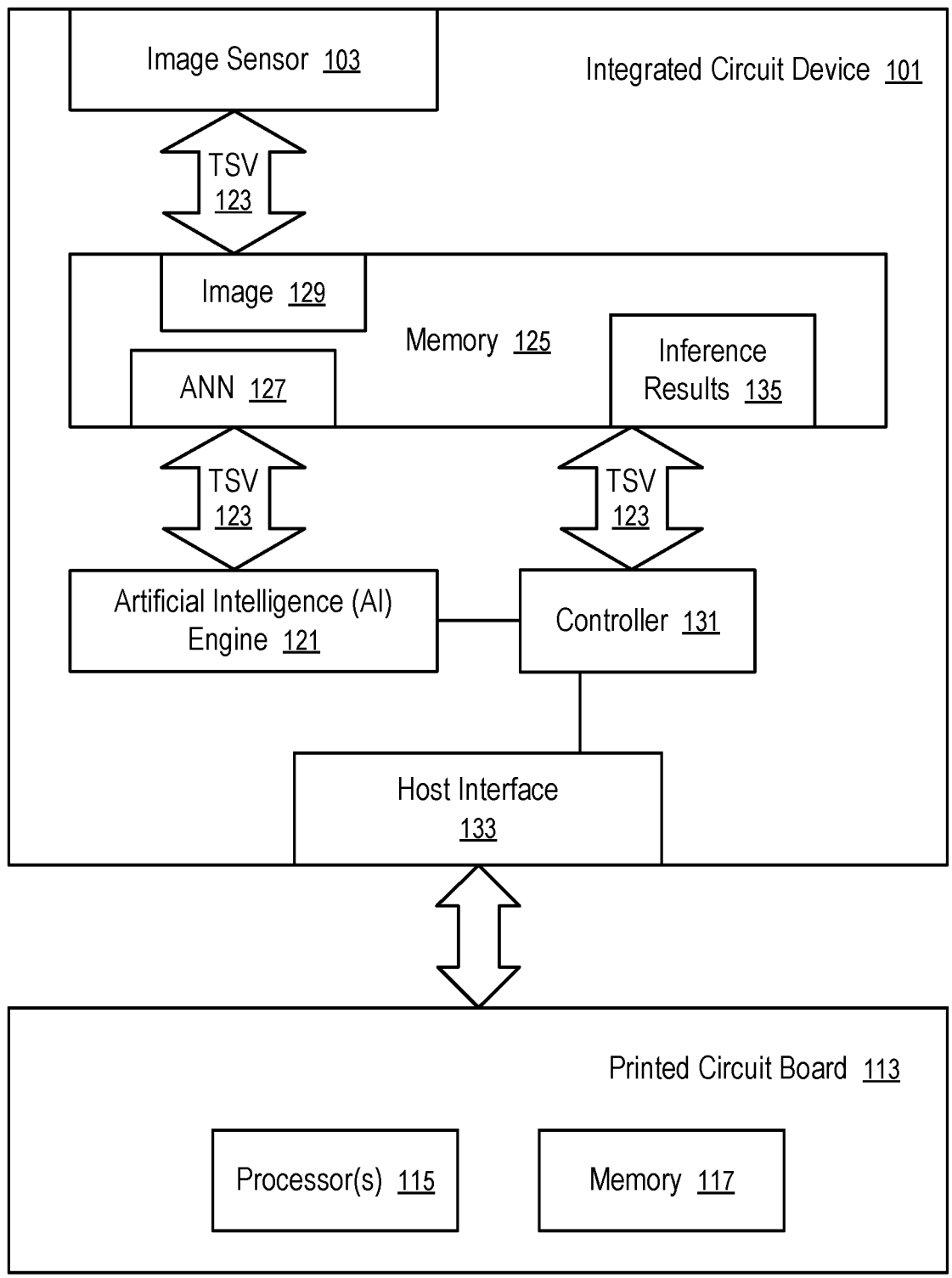
FIG. 3 shows an integrated circuit device having memory stacked between an image sensor and an Artificial Intelligence (AI) engine according to one embodiment.

FIG. 3 shows an integrated circuit device (101) having memory (125) stacked between an image sensor (103) and an Artificial Intelligence (AI) engine (121) according to one embodiment. The image sensor (103) of FIG. 3 can include ISP ASIC (105) illustrated in FIGS. 1 and 2. The components of the integrated circuit device (101) are packaged within a single integrated circuit package.

In FIG. 3, one or more integrated circuit dies of the memory (125) can be sandwiched between the integrated circuit die of the image sensor (103) and the integrated circuit die of the AI engine (121). Through-Silicon Vias (TSV) (123) can be used to provide ultra-high bandwidth for the image sensor (103) to store image data into the memory (125), and for the AI accelerator (125) to process and feed the image data into an ANN (127).

A controller (131) is configured in the integrated circuit device (101) of FIG. 3 to control the operations of the AI engine (121), manage the memory (125), and control the host interface (133) for communication with the host system (e.g., processor(s) (115) on the printed circuit board (113)).

For example, the host system can communicate with the integrated circuit device (101) via a memory bus, or a peripheral bus. For example, the controller (131) and the host interface (133) can be configured to communicate with the host system in accordance with a communication protocol for a Peripheral Component Interconnect express (PCIe) bus, a Serial Advanced Technology Attachment (SATA) bus, a Universal Serial Bus (USB) bus, and/or a Storage Area Network (SAN).

The controller (131) and the host interface (133) can be formed on a same integrated circuit die of the AI engine (121), or a separate integrated circuit die.

Optionally, the image sensor (103), the memory (125), and the AI engine (121) of the integrated circuit device (101) can be configured vertically into multiple sections that can operate independent from each other in parallel. Further, the controller (131) can control and/or execute computation across the sections.

The ANN (127) of the integrated circuit device (101) can be configured to generate inference results (135) for the host system (e.g., processor(s) (115) on the printed circuit board (113)). Thus, it's not necessary to transmit the image (129) to the host system.

For example, the integrated circuit device (101) can be configured in a camera of an autonomous vehicle to recognize objects in an environment of the vehicle. Thus, the ANN (127) can be used to identify an object, recognize an object, and/or determine a classification of an object for the host system using the image (129) at a high resolution. For example, the image sensor (103) can generate images at a high resolution and/or a high refreshing rate (e.g., a high frame rate) to allow the AI engine (121) to generate the inference results (135) with high accuracy. Since the data volume of the inference results (135) are significantly smaller than the images (129), the communication bandwidth requirement for the connection between the integrated circuit device (101) and the host system (e.g., processor(s) (115) on the printed circuit board (113)) can be reduced by transmitting the inference results (135), instead of the high-resolution images (129).

Optionally, the integrated circuit device (101) can also generate images at a reduced resolution and/or a reduced refreshing rate for the host system. A high resolution image may be requested by the host system from the integrated circuit device (101) on demand.

Optionally, the AI engine (121) can identify an object from the image and extract a portion of the image containing the object based on the size of the object in the image and generate an image of the object according to a predetermined size and resolution. For example, the integrated circuit device (101) can digitally zoom in an object of interest to fill the object in an image of a predetermined number of pixels. Thus, the object is presented in the zoomed-in image with a predetermined resolution.

Figure 4:
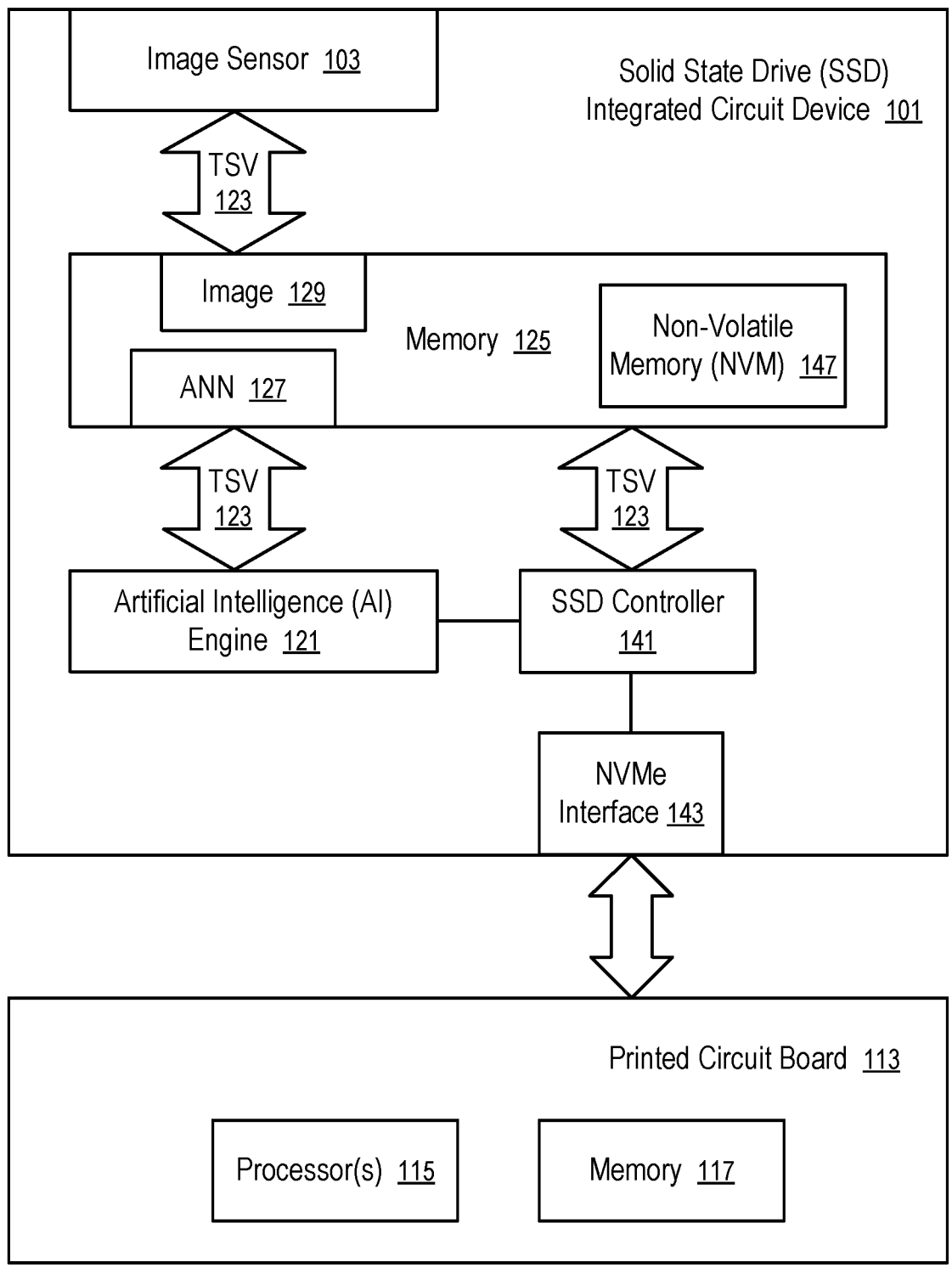
FIG. 4 shows a solid state drive integrated circuit device having an image sensor according to one embodiment.

FIG. 4 shows a Solid State Drive (SSD) integrated circuit device (101) having an image sensor (103) according to one embodiment. The image sensor (103) of FIG. 4 can include ISP ASIC (105) illustrated in FIGS. 1 and 2. The components of the integrated circuit device (101) are packaged within a single integrated circuit package.

The SSD integrated circuit device (101) has a non-volatile memory (NVM) (147) that can retain data when the SSD integrated circuit device (101) is not powered. The memory (125) can include both volatile memory (e.g., DRAM, SRAM) and non-volatile memory (NVM) (147) (e.g., NAND flash memory, NOR flash memory, cross-point memory). For example, the SSD integrated circuit device (101) can be packaged to have the form factor of a Ball Grid Array (BGA) Solid State Drive (SSD).

The integrated circuit device (101) of FIG. 4 includes an NVMe (NVM Express, or Non-Volatile Memory Host Controller Interface Specification (NVMHCIS)) interface (143) that allows a host system (e.g., processor(s) (115) on the printed circuit board (113)) to write data into and read data from the memory (125) and/or the NVM (147) using a communication protocol for an SSD.

Unlike a conventional SSD, the integrated circuit device (101) of FIG. 4 includes an image sensor (103).

Further, as in FIG. 3, the integrated circuit device (101) of FIG. 4 has an AI engine (121), which can reduce the full-resolution image (129) from the image sensor (103) into inference results (135), extracted images of objects, and/or reduced-resolution images. The controller (141) manages the storage of the data generated from the image (129) in the non-volatile memory (147), and/or background maintenance operations, such as garbage collection, wear leveling, etc.

In a garbage collection process, the controller of an SSD searches for pages of storage media that have been marked as stale, relocates valid data of pages that are in the same blocks as the stale pages, and erases the blocks to make the blocks ready for write operations. In a wear leveling operation, the controller of an SSD moves data from a more frequently erased page to a less frequently erased page.

Since the image (129) and/or the inference results (135) are stored in the memory (125) of the integrated circuit device (101) of FIG. 4 in a way data is stored in an SSD, the host system can retrieve the data by sending read commands to the NVMe interface (143) of the integrated circuit device (101). Since the data is written into the memory (125) automatically by the SSD controller (141), the host system can retrieve the data without issuing write commands to the NVMe interface (143) to store the data to be retrieved.

Thus, instead of communicating with a host system using a camera protocol (e.g., MIPI CSI), the integrated circuit device (101) of FIG. 4 stores the image (129) from the image sensor (103) and/or the references results (135) from the AI engine (121) in the memory (125) as a Solid State Drive (SSD).

Figure 8:
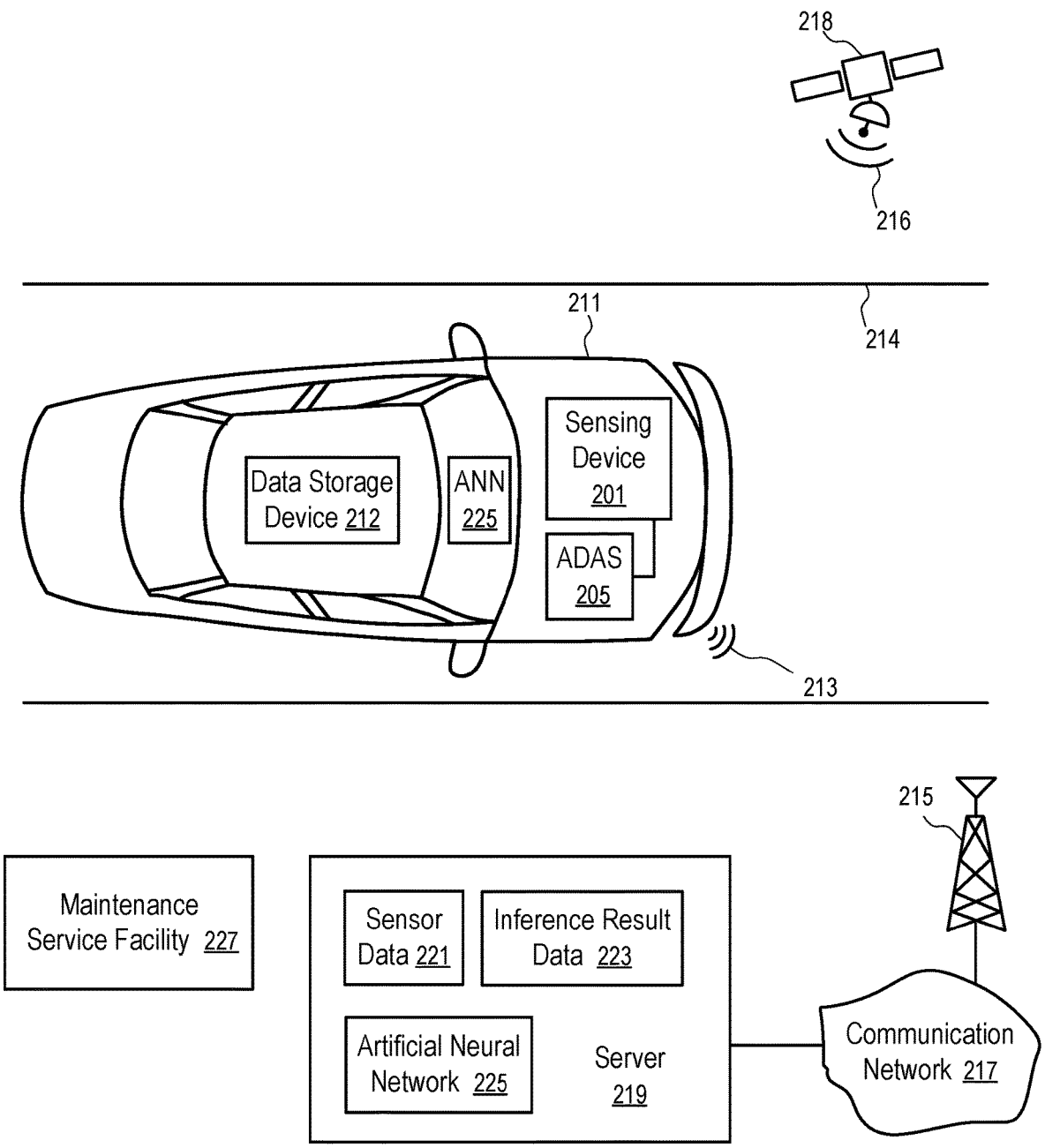
FIG. 8 shows a system having a vehicle configured to collect and process sensor data according to some embodiments.
Figure 9:
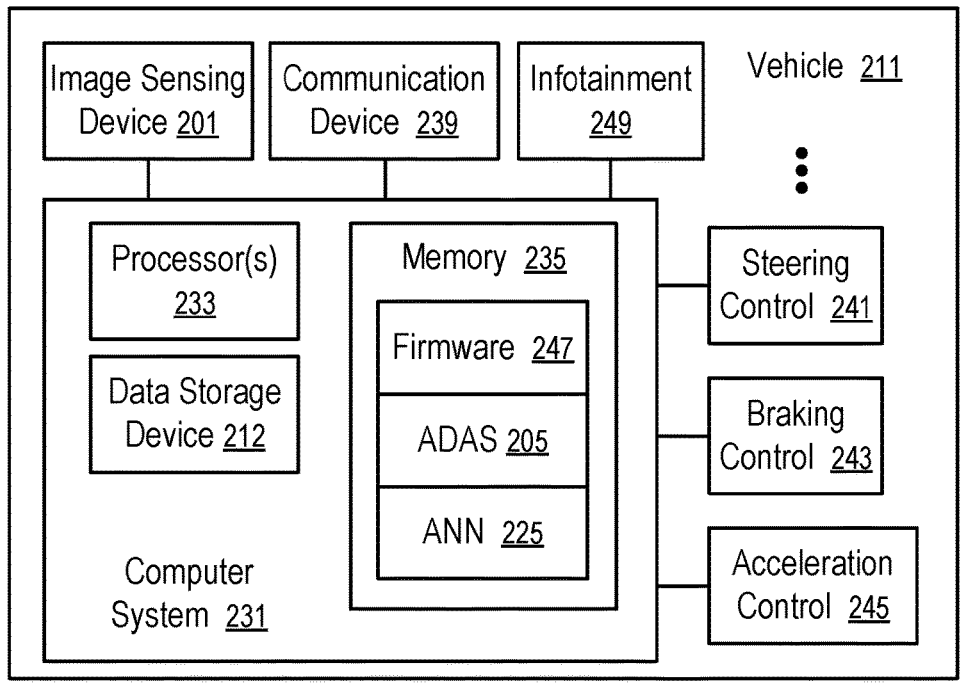
FIG. 9 shows an autonomous vehicle according to one embodiment.

For example, the SSD integrated circuit device (101) can be configured in a camera of an autonomous vehicle (e.g., 211 illustrated in FIGS. 8 and 9). The storage capability of the memory (125) can function as a black box (or a portion of a black box system) for recording information leading to an accident or a near accident event.

For example, the memory (125) can be configured to have a storage capacity to store at least images (129) generated in a most recently time period of a predetermined length (e.g., 30 seconds); if there is an accident or a near accident event, the images (129) saved in the memory (125) can be retrieved and analyzed for accident investigation, in a way similar to the retrieval of data from a black box data recorder configured on a vehicle.

In general, the memory (125) can include volatile memory (e.g., DRAM (107) or SRAM) and Non-Volatile Memory (NVM) (147) (e.g., NAND/NOR flash memory, cross-point memory). In response to an accident or a near accident event, the integrated circuit device (101) is provided with sufficient power (e.g., via a capacitor, or a backup power source, such as a battery) at least for a period of time; and the accident or a near accident event can cause the integrated circuit device (101) to copy into the NVM (147) the images (129) that are currently in the volatile memory (e.g., DRAM (107)).

The images (129) generated in a most recently time period of a predetermined length (e.g., 30 seconds) can be stored into the memory (125) in a cyclic way such that the newest images overwrite the oldest images from the image sensor (103). Such an arrange reduces the storage capacity requirement of the memory (125). Further, the AI engine (121) locally processes the images (129) from the image sensor (103) and generates the inference results (135) that are likely to be used by the host computer (e.g., the computer system (231) of an autonomous vehicle (211) illustrated in FIG. 9); and the SSD integrated circuit device (101) stores the inference results (135) for a period (e.g., hours) that is much longer than the predetermined length (e.g., 30 seconds) for recording the images (129), due to the reduced size of the inference results (135).

For example, a host system of the integrated circuit device (101) can be the processor(s) (115) on the printed circuit board (113), or the processor(s) (233) in a computer system (231) of an autonomous vehicle (211). Since the data that is likely to be used by the host system is stored with the memory (125), the integrated circuit device (101) does not have to continuously stream data to the host system for processing in response to the continuous image stream from the image sensor (103). Instead, the host system may read data from the memory (125) using an NVMe protocol at a time determined by the host system. The host system can access the memory (125) using the NVMe interface (143) and the SSD controller (141), as if the integrated circuit device (101) were an SSD or a black box to which the host system had previously issued write commands to store therein the images and/or inference results.

In some embodiments, the host system can store trigger conditions in the memory (125) such that when the inference results (135) meet the trigger conditions, the controller (141) and/or the AI engine (121) of the integrated circuit device (101) can generate an alert for the host system, causing the host system to read the inference results (135) that meet the trigger conditions. For example, the alert can include a memory address of a location in the memory (125) storing the inference results (135) and/or an attribute of an object in the image (129) that causes the alert, such as an identification/classification of the object.

Optionally, the integrated circuit device (101) of FIG. 4 can be packaged as a Ball Grid Array (BGA) Solid State Drive (SSD). The images generated by the image sensor (103) can be buffered/stored cyclically in the memory (125) and/or the NVM (147). The AI engine (121) applies the ANN (127) to process the images (129) from the image sensor (103) to generate neural network outputs, such as identifications of objects recognized from the images (129), attributes of the objects (e.g., size, classifications, geo-locations, extracted images of the objects of a standardized resolution).

Since the image data is analyzed internally in the integrated circuit device (101) and converted into inference results (135), the likelihood of the host system having a need to retrieve the images (129) is reduced or substantially eliminated. The host system can issue read commands to the NVMe interface (143) to retrieve the inference results (135). The read commands can be generated by the host system periodically, or in response to an alert from the integrated circuit device (101) when trigger conditions stored in the memory (125) are satisfied.

Since the integrated circuit device (101) can store a most recent segment of the image stream from the image sensor (103) and/or a time period of inference results generated from the images (129) from the image sensor (103), the integrated circuit device (101) can be configured as a part of a black box system of an autonomous vehicle (211). For example, in response to an event associated with an accident or near accident, the host system can instruct the integrated circuit device (101) to stop recording new images. After the images and/or inference results associated with an accident or near accident event have been retrieved and stored in a secure location, the host system can instruct the integrated circuit device (101) to resume the black box function of recording new images.

Optionally, the memory (125) can be configured with the capacity of storing images and/or reference results associated with multiple accidents and/or near accident events. Thus, after an accident or near accident event, the integrated circuit device (101) can resume normal operations with minimal delays in processing black box data using a new slot of storage capacity. When all slots have been used, new data can be stored into the slot previously used to record the oldest accident or near accident event.

Figure 5:
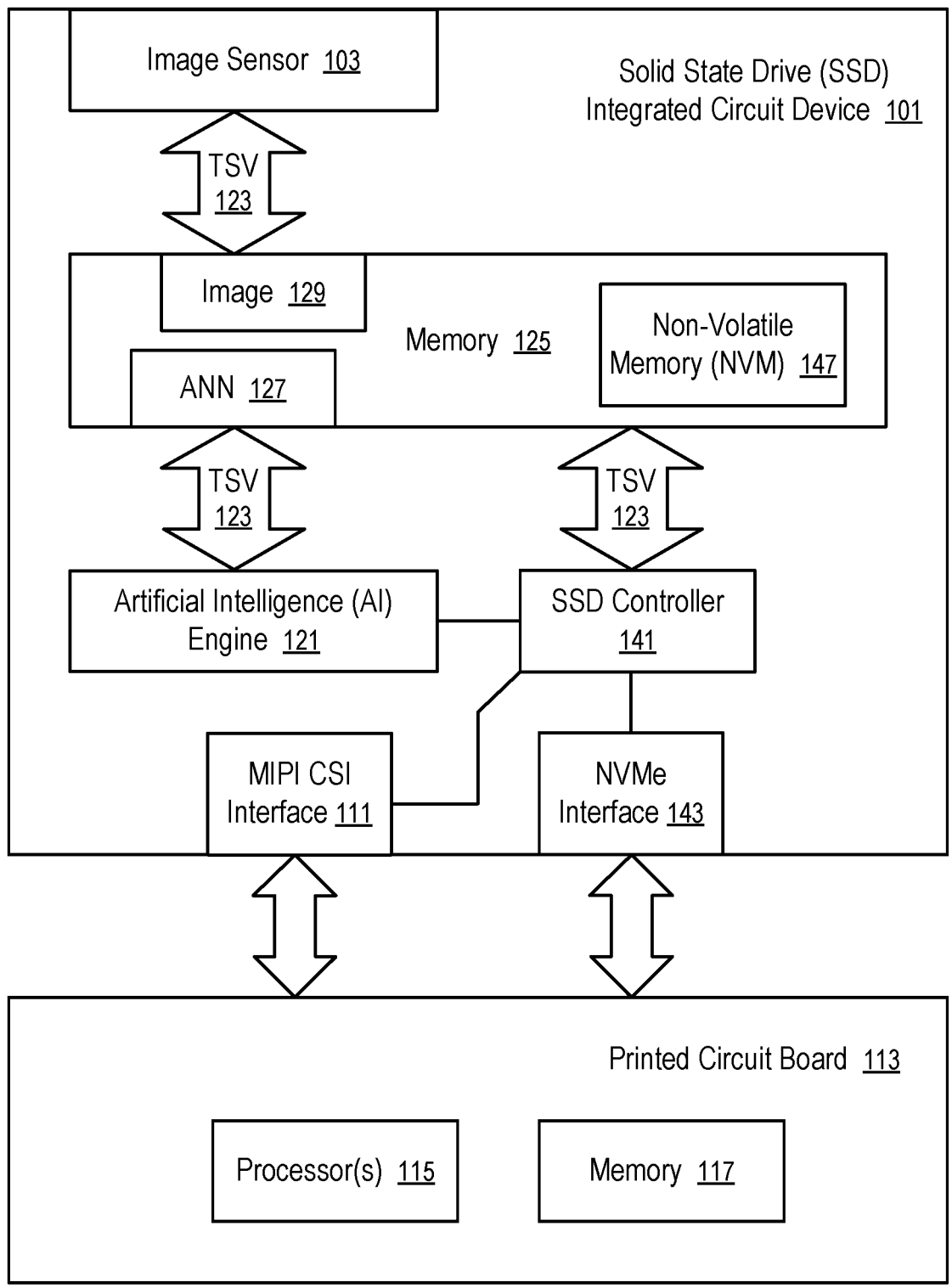
FIG. 5 shows an integrated circuit device having a solid data drive interface and a camera interface according to one embodiment.

FIG. 5 shows an integrated circuit device (101) having a solid data drive interface (e.g., 143) and a camera interface (e.g., 111) according to one embodiment. The image sensor (103) of FIG. 5 can include ISP ASIC (105) illustrated in FIGS. 1 and 2. The components of the integrated circuit device (101) are packaged within a single integrated circuit package.

The integrated circuit device (101) of FIG. 5 can be configured to have an image sensor (103), memory (125), ANN processing logic (e.g., 121 and/or 141), an SSD host interface (e.g., NVMe interface (143)), and a camera interface (e.g., MIPI CSI (111)). The image sensor (103) generates an image stream at a high frame rate and a high resolution. The high frame-rate, high-resolution image stream is processed by the ANN processing logic (e.g., 121 and 141) to generate inference results (135) that are stored in the memory (125) and/or the NVM (147). The integrated circuit device (101) down-samples the original image stream obtained from the image sensor (103) to generate an output image stream for the camera interface (111). The down-sampling can be customized at a customized frame rate and resolution. The integrated circuit device (101) can be connected to a host system, such as processor(s) (115) on the printed circuit board (113), processors (233) of the computer system (231) of an autonomous vehicle (211), etc. The host system can access the inference results (135) via the SSD host interface (143), in a way similar to FIG. 4. Further, the host system can also obtain the output image stream via the camera interface (111). The availability of the output image stream at the camera interface (111) reduces the storage capacity requirement of the memory (125). The AI engine (121) is configured to provide a more efficient image stream by removing less useful image data from the original image stream from the image sensor (103). The SSD host interface (e.g., 143) can be used to customize the down-sampling operation, and/or to retrieve high-resolution images when needed.

As in FIGS. 3 and 4, the integrated circuit device (101) of FIG. 5 has an AI engine (121), which can reduce the full-resolution image (129) into inference results (135), extracted images of objects, and/or reduced-resolution images.

As in FIG. 4, the integrated circuit device (101) of FIG. 5 can store in the memory (125) and/or the NVM (147) a recent stream segment of the images (129) from the image sensor (103) and/or a recent stream segment of the inference results (135) from the AI engine (121). The host system can access the images (129) and the inference results (135) by issuing read commands to the NVMe interface (143).

Further, the integrated circuit device (101) of FIG. 5 has a Mobile Industry Processor Interface (MIPI) Camera Serial Interface (CSI) (111) interface (111) that provides processed image data to the host system.

The image data provided via the MIPI CSI interface is generated by the AI engine (121) from the original images (129) of the image sensor (103).

For example, the image sensor (103) can generate a stream of images (129) at a high frame rate and a high resolution such that the rate of image data of the stream exceeds the communication bandwidth allowed by the MIPI CSI interface (111). The AI engine (121) intelligently reduces the size of the stream of the image (129) by reducing the frame rate, resolution, and/or content that are not likely to be of interest to the host system, such as processor(s) (115) on the printed circuit board (113), processor(s) (233) of a computer system (231) of an autonomous vehicle (211), etc.

For example, the AI engine (121) can analyze the image (129) to identify objects of interest, digitally zoom in to the objects one at a time, and presenting different objects being zoomed in using different frames. Thus, the AI engine (121) presents the images in the MIPI CSI interface (111) by removing information of no interest to the host system, reducing redundancy information, and zooming in to objects of interest to the host system.

For example, when the MIPI CSI interface (111) is presenting an object being zoomed in, the host system can read reference results of the object by issue read commands to the NVMe interface (143). Optionally, the host system may further analyze the images of the object being zoomed in and being provided in the image stream via the MIPI CSI interface (111).

For example, the MIPI CSI interface (111) can provide an initial image showing a scene captured by the image sensor (103) (with or without reducing the resolution). The host system can analyze the initial image, optionally in view of the inference results (135) generated by the AI engine (121), and instruct the Integrated Circuit Device (101) to digitally zoom in to an object or region in the scene. Thus, subsequent images provided in the MIPI CSI interface (111) shows the object or region of interest with other regions being cropped off.

For example, the host system can prioritize the objects identified in the inference results and instruct the Integrated Circuit Device (101) to zoom into the prioritized objects one at time. In the image stream transmitted via the MIPI CSI interface (111), each object in the prioritized list can be presented via one or more continuous frames; and an image stream presented via the camera interface (111) can loop over the presentation of the objects identified in the prioritized list until some of the objects move out of the scene, other objects move into the scene, and/or the priority list is adjusted by the AI engine (121) and/or the host system.

Figure 6:
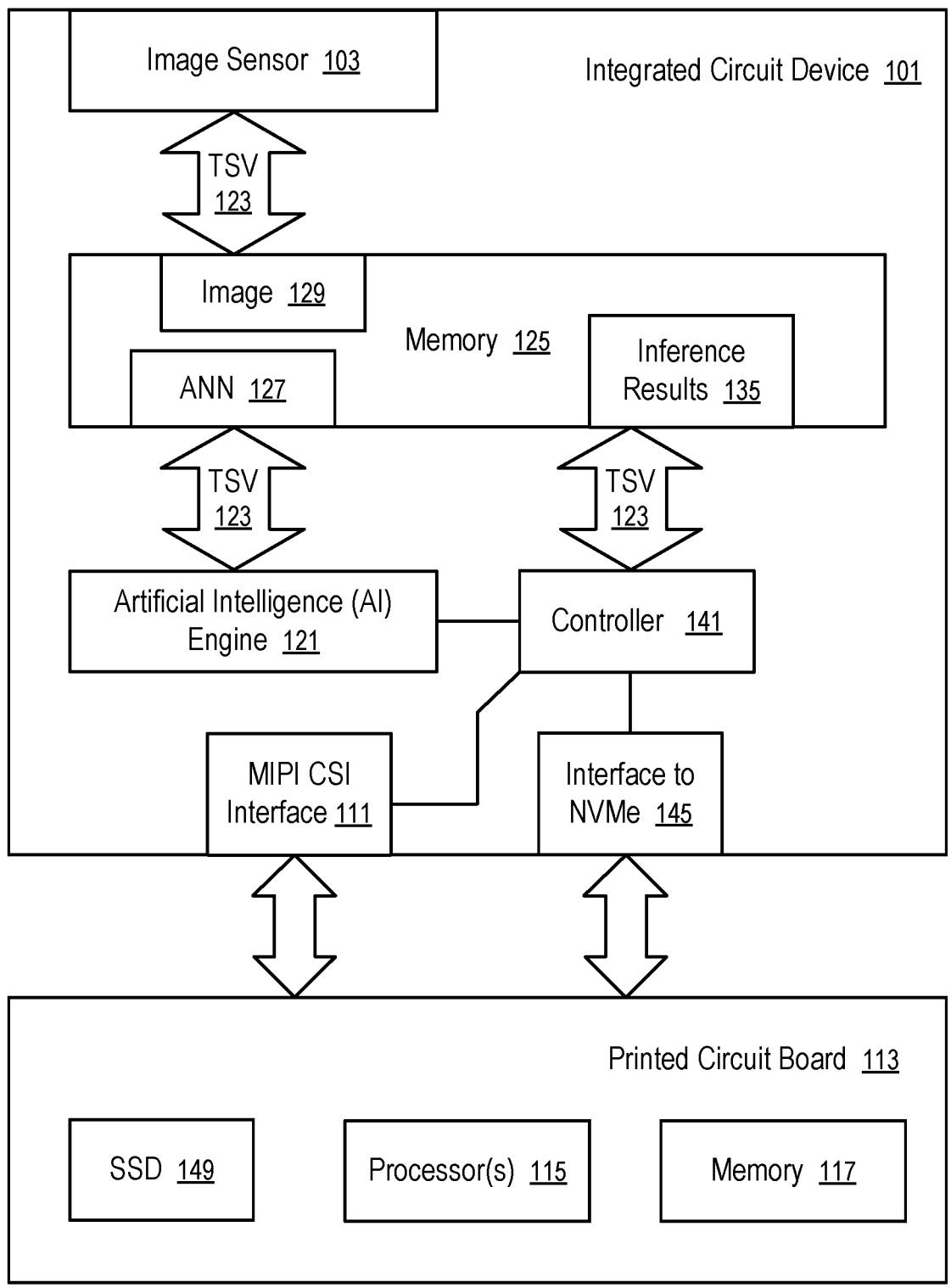
FIG. 6 shows an integrated circuit device having a camera interface and an interface to access a solid state drive according to one embodiment.

FIG. 6 shows an integrated circuit device (101) having a camera interface (111) and an interface (145) to access a solid state drive (109) according to one embodiment. The image sensor (103) of FIG. 6 can include ISP ASIC (105) illustrated in FIGS. 1 and 2. The components of the integrated circuit device (101) are packaged within a single integrated circuit package.

The integrated circuit device (101) of FIG. 6 can include an image sensor (103), memory (125), ANN processing logic (e.g., 121 and/or 141), an interface (145) to an SSD (149) that is external to the integrated circuit device (101). Optionally, the integrated circuit device (101) of FIG. 6 can also have a camera interface (e.g., MIPI CSI interface (111)) to export an image stream in real time (e.g., in a way as discussed above in connection with FIG. 5). Optionally, the memory (125) of the integrated circuit device (101) of FIG.

6 includes NVM (147) and an NVMe interface (143) that allows a host system to access the memory (125) in a same way of accessing an SSD.

In FIG. 6, the interface (145) of the integrated circuit device (101) allows the integrated circuit device (101) to expand its storage capacity of the memory (125) via an external SSD (149). The interface (145) functions as a host/originator to write data into the external SSD. For example, the external SSD (149) can be accessed via NVDIMM-p or/or NVMe. The integrated circuit device (101) can write data into the external SSD (149), such as inference results/outputs from the ANN (127), images selected and/or downsized according to predetermined rules or configuration parameters. The external SSD (149) provides the flexibility in configuring the storage/memory capacity in the system. The host system can access the external SSD (149) for the inference results and/or images that are stored into the SSD (149) by the integrated circuit device (101) without the help from the host system.

Optionally, the camera interface (111) can be omitted in FIG. 6.

As in FIGS. 3, 4, and 5, the integrated circuit device (101) of FIG. 6 has an AI engine (121), which can reduce the full-resolution image (129) into inference results (135), extracted images of objects, and/or reduced-resolution images.

In FIG. 6, the interface (145) to NVMe devices (e.g., an SSD (149) and/or memory (117)) allows the integrated circuit device (101) to function as a host of an NVMe device (e.g., an SSD (149), memory (117)) using a NVMe protocol. Thus, the integrated circuit device (101) can store images (e.g., 129) and/or inference results (135) into an external SSD (149) without the help from a host system (e.g., the processor(s) (115)). Subsequently, the host system (e.g., the processor(s) (115, 233)) can retrieve the images (129) and the inference results (135) from the external SSD (149).

For example, the SSD (149) can be configured as a black box data recorder of an autonomous vehicle (211). In response to an accident or a near accident event, the integrated circuit device (101) can use the interface (145) to store the image (129) and the inference results related to the event directly to the black box data recorder (e.g., 149), without going through the host system (e.g., processor(s) (115)).

The integrated circuit devices of FIGS. 1-5 can be used as integrated image sensing devices to reduce data traffic to a host system, such as an image sensing device configured in a motor vehicle, or another vehicle, with or without an Advanced Driver Assistance System (ADAS).

For example, an integrated image sensing device of FIG. 2, 3, 4, 5 or 6 can include an image sensor (103), a memory device (125), and an inference engine (e.g., 121 and/or 131) configured to convert images generated by the image sensor into inference results (135) for transmitting to a host system for further analysis and/or generate a more efficient image stream provided in the camera interface (111). The intelligence provided by the inference engine (e.g., 121 and/or 131) can reduce or eliminate the amount of image data transmitted to the host system for processing during a typical scenario.

For example, the image sensor can be formed on an integrated circuit die. The inference engine can be implemented via logic circuits formed on another integrated circuit die; and memory cells of the memory device can be formed on one or more further integrated circuit dies. The integrated circuit dies of the inference engine and integrated circuit dies of the memory device can be stacked on the back of the integrated circuit die of the image sensor, connected using Through-Silicon Via (TSV) (or through wire bonding, or other interconnect techniques), and enclosed within an integrated circuit package. Optionally, the pins of the integrated circuit package of the integrated image sensing device can be configured to communicate with a host system using a standardized communication protocol for memory devices or storage devices, as if the integrated image sensing device were a storage device, or a memory chip. For example, the integrated image sensing device can be packaged to have a form factor and/or the interface of a Ball Grid Array (BGA) Solid State Driver (SSD).

Alternatively, the image sensor, the inference engine, and/or the integrated circuit memory can be enclosed in separate integrated circuit packages that are connected via a printed circuit board configured within a housing of the image sensing device. The image sensing device can be connected to a host system via a memory bus, or a peripheral bus, as if the image sensing device were a memory device, or a storage device.

The high data communication bandwidth configured within the image sensing devices allows the image sensor to capture images at a high number of frames per second than that would be allowed to be transmitted over a conventional connection from a peripheral device to a host system. The inference engine processes the images and/or performs analytics to generate inference results with a data size that is significantly smaller than the size of the pixel images generated by the image sensor. Thus, the data traffic upstream from the image sensing device to the host system can be reduced.

For example, an image sensing device according to one embodiment disclosed herein can be used in an ADAS of a vehicle (e.g., an autonomous driving system). The analytics capability of the image sensing device allows the vehicle to offload a portion of its image based ANN processing to the image sensing device and thus frees its processing power and communication bandwidth for other tasks. The vehicle can make driving decisions based on images at a frame number per second higher than that limited by the communication bandwidth of a connection between the image sensing device and a processor of the vehicle.

Image sensors in cameras used in automotive and other applications can generate millions of pixels per frame and several frames per second. This data traffic is typically routed to a Central Processing Unit (CPU) for processing. Such an arrangement can clog the CPU and ultimately result in a restriction on the number of frames per second that can be processed. The techniques of image sensing devices disclosed herein remove or reduce such restrictions.

When an integrated image sensing device having memory and an inference engine stacked with an image sensor is used, the image data is reduced to inference results that can be further processed by the CPU (e.g., in a further ANN). For example, an ANN for an ADAS can include a portion that is configured to process images from a camera. Such a portion can be configured in the inference engine of the integrated image sensing device to generate neuron outputs that is communicated from the integrated image sensing device. Instead of the image data, the neuron outputs can be transmitted from the integrated image sensing device to allow the remaining portion of the ANN of the ADAS to complete its inference.

For example, the portion of ANN implemented in the inference engine of the integrated image sensing device can perform machine learning based analytics, such as pixel segmentation, feature extraction, object detection, and/or object classification, such that the need to transmit to a host system the data about individual pixels can be reduced or eliminated.

Preferably, the memory device in the integrated image sensing device has wide input/output connection to offer high bandwidth with the image sensor and the inference engine optimized for machine learning tasks. Optionally, the memory device can include built in functions for accelerating certain ANN operations, such as dot-product and tensor access.

Figure 7:
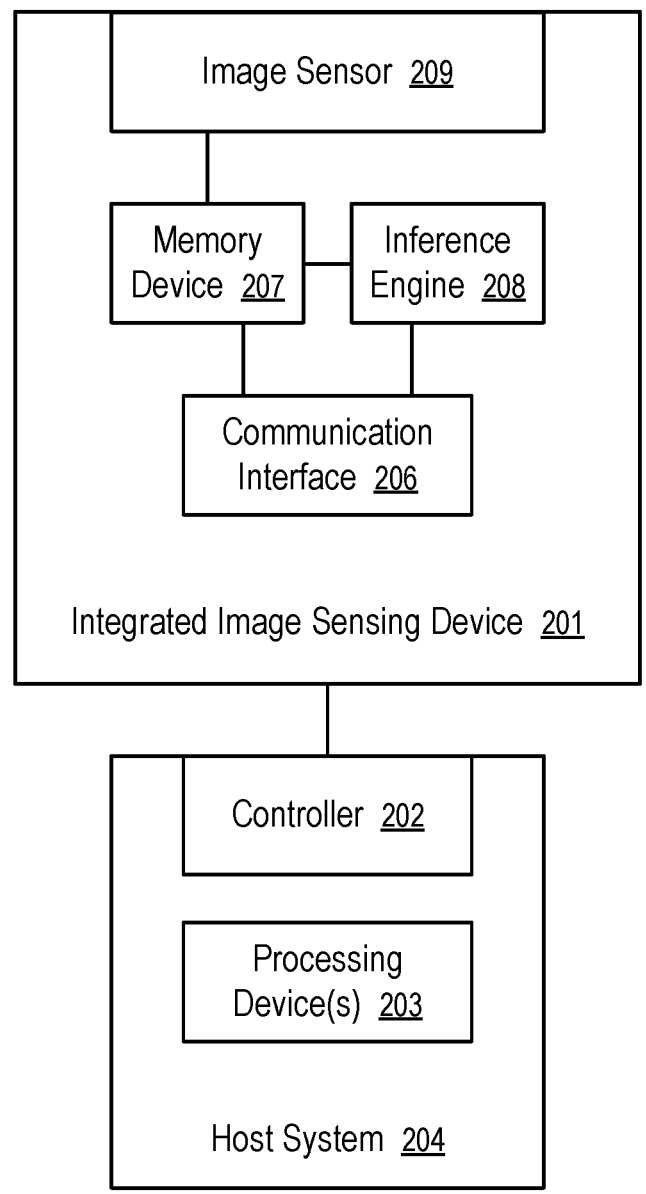
FIG. 7 shows an integrated image sensing device connected to a host system according to one embodiment.

FIG. 7 shows an integrated image sensing device (201) connected to a host system (204) according to one embodiment.

In FIG. 7, the integrated image sensing device (201) has an image sensor (209), a memory device (207), an inference engine (208), and a communication interface (206).

In one embodiment, the image sensor (209), the memory device (207), the inference engine (208), and the communication interface (206) are formed on multiple integrated circuit dies that are stacked to form a Three-Dimensional Integrated Circuit (3D IC). Through-Silicon Via (TSV) can be used to implement high communication bandwidth among the image sensor (209), the memory device (207), and the inference engine (208). Further, the memory device (207) can be configured to accelerate and/or optimize the operations of the inference engine (208), as discussed further below.

Optionally, the integrated image sensing device (201) can be enclosed in one integrated circuit package with input/output connections to a controller (202) of the host system (204). For example, the integrated image sensing device (201) can be package as a BGA SSD that has the image sensor (209) and the inference engine (208). For example, the connection between the integrated image sensing device (201) and the host system (204) can be in accordance with a communication protocol for a Peripheral Component Interconnect express (PCIe) bus, a Serial Advanced Technology Attachment (SATA) bus, a Universal Serial Bus (USB) bus, and/or a Storage Area Network (SAN).

In some implementations, the inference engine (208) includes programmable processing units; and the instructions for the processing units can be stored in the memory device (207) to customize the operations of the inference engine (208).

For example, an ANN model can be stored in the memory device (207); and the inference engine (208) is configured to apply the ANN model to the images from the image sensor (209) to generate inference results and store the inference results in the memory device (207). The host system (204) has one or more processing device(s) (203) and a controller (202) to access the communication interface (206) over communication link between the integrated image sensing device (201) and the host system (204). The host system (204) can issue read commands to retrieve the inference results stored in the memory device (207). For example, the communication interface (206) can include an interface in accordance with a Non-Volatile Memory Host Controller Interface Specification (NVMHCIS) or NVM Express (NVMe). For example, the NVMe interface of the integrated image sensing device (201) can be used to receive data and commands from the host system (204). For example, the host system (204) can send write commands to store the ANN model into the memory device (207) of the integrated image sensing device (201) and read commands to retrieve inference results of the inference engine (208) from the memory device (207) in accordance with an NVMe protocol. For example, the communication interface (206) can be configured to allow the host system (204) to access the memory device (207) of the integrated image sensing device (201) as a Solid State Drive (SSD). Optionally, the communication interface (206) (or another interface) can include an NVMe interface for communicating with an external Solid State Drive (SSD) (e.g., separate from the integrated image sensing device (201) and the host system (204)) to store inference results generated by the inference engine (208) and/or image data generated by the image sensor (209) or derived from the images generated by the image sensor (209).

For example, the integrated image sensing device (201) can be configured in a vehicle illustrated in FIG. 8.

FIG. 8 shows a system having a vehicle (211) configured to collect and process sensor data according to some embodiments.

The vehicle (211) in FIG. 8 has a data storage device (212), an image sensing device (201) (e.g., as illustrated in FIG. 7), an ANN (225), and an ADAS (205) configured to process sensor data, including inputs from the image sensing device (201), to generate control signals for the vehicle (211).

In general, one or more sensors (e.g., 201) can be configured on the vehicle (211) to generate sensor data input to the ADAS (205) and/or the data storage device (212). The data storage device (212) and/or the ADAS (205) can be configured to use the ANN (225) to generate inference results. The inference results can include a control signal for operating or driving the vehicle (211), a suggestion for a maintenance service of the vehicle (211), etc.

In some implementations, at least a portion of the data generated by the sensors (e.g., 201) is used in both the ADAS (205) for driver assistance and in the ANN (225) for maintenance prediction. Optionally, the output of the ANN (224) can be used in both the data storage device (212) and in the ADAS (205). The ANN (225) can be part of the ADAS (205).

The image sensing device (201) can be configured in a digital camera, lidar, radar, ultrasound sonar, etc. The inference engine (208) of the image sensing device (201) is configured to process the images within the sensing device (201) and communicate its inference results to the ADAS (205), the ANN (225) and/or the data storage device (212).

Optionally, the ADAS (205) can selectively requests the sensing device (201) to transmit selected images from the sensing device (201), when the inference outputs from the sensing device (201) satisfy certain requirements, or when the ADAS (205) or the ANN (225) determines a need to further analyze the images that generate the inference results from the sensing device (201). Such images can be part of sensor data (221) is that further analyzed to further train the ANN (225) on the server (219) to generate desired inference results (e.g., 223).

For example, when the object recognition or classification in the sensing device (201) and/or in the ADAS (205) encounters unknowns, difficulties, uncertainties, or when a situation is to be further analyzed, the ADAS (205) can request the sensing device (201) to transmit the corresponding images for storing in the data storage device (212). The stored data can be subsequently further processed by a server (219) and/or a maintenance service facility (227).

In general, the vehicle (211) can have other sensors that provide inputs for the ADAS (205), such as brake sensors, speed sensors, acceleration sensors, airbag sensors, a GPS (Global Positioning System) receiver, audio sensors/microphones, vibration sensors, force/stress sensors, deformation sensors, motion sensors, temperature sensors, etc. Some of the sensors (201) can be configured primarily to monitor the environment of the vehicle (211) for driving decisions and/or assistances; and other sensors (201) can be configured primarily to monitor the operating and/or health conditions of one or more component of the vehicle (211), such as an internal combustion engine, an exhaust system, an electric motor, a brake, a tire, a battery, etc.

In general, the outputs of the sensor(s) (e.g., 201) as a function of time are provided as a sensor data stream to the ADAS (205) and/or the ANN (225) to provide driver assistance (e.g., autonomous driving) and maintenance prediction. In FIG. 8, the image sensing device (201) is further configured to provide its inference results generated from its images as part of the sensor data stream, instead of transmitting the images to the main processor of the vehicle (211) implementing the ANN (225). Thus, the data size of the sensor data stream can be reduced, the communication bandwidth from the sensing device (201) to the ADAS (205) and/or the data storage device (212) can be reduced, and the computation load on the ADAS (205) and/or the data storage device (212) can be reduced.

The ANN (225) can include an SNN configured to classify time-based variations of sensor data and/or detect deviation from known patterns of sensor data of the vehicle (211). When the ANN (225) detects the deviation from known patterns, the sensor data corresponding to the deviation can be stored in the data storage device (212) for further analysis and/or for further training of the ANN (225).

The data storage device (212) of the vehicle (211) can be configured to record sensor data for a period of time that can be used in the ANN (225) for predictive maintenance and/or used to further train the ANN (225). The maintenance service facility (e.g., 227) can download the sensor data (221) from the data storage device (212) and provide the sensor data (221) and the corresponding inference result data (223) to the server (219) to facilitate the training of the ANN (225).

Optionally, or in combination, the data storage device (212) is configured with a machine learning module to customize and/or train the ANN (225) installed in the vehicle (211).

The vehicle (211) can have a wireless communication device to communicate with a remote server (219) via wireless signals (213) and a communication network (217). The remote server (219) is typically configured at a location away from a road (214) on which the vehicle (211) is in service. For example, the vehicle (211) may provide some sensor data (221) to the server (219) and receive update of the ANN (225) from the server (219).

The communication network (217) can be a cellular phone network having one or more base stations (e.g., 215) to receive the wireless signals (e.g., 213). Alternatively, or in combination, the communication network (217) can include the Internet, where the wireless local area network signals (e.g., 213) transmitted by the vehicle (213) is received in an access point (e.g., 215) for further communication to the server (219). In some implementations, the vehicle (211) uses a communication link (216) to a satellite (218) or a communication balloon to communicate with the server (219).

The server (219) can also communicate with one or more maintenance service facilities (e.g., 227) to receive the sensor data (221) and/or the desired inference result data (223) of vehicles (e.g., 211).

For example, the desired inference result data (223) can be generated by a human operator inspecting the sensor data (221) (e.g., images from the image sensing device (201)) and/or relevant conditions of the vehicle (211). For example, the desired inference result data (223) can include inspection records and/or service records of components of the vehicles (e.g., 211). For example, the inspection records and/or service records can indicate the degree of wear and tear of components inspected during their services at the maintenance service facilities (e.g., 227), the identification of failed or malfunctioning components, etc. The sensor data (221) of the vehicles (e.g., 211) obtained in a time period relevant to the desired inference result data (223) can be used to train an ANN (225) at the server (219) to improve inference capability of the ANN (225).

The updated ANN (225) can be installed in the vehicle (211) at the maintenance service facility (227). Alternatively, the updated ANN (225) can be transmitted to the vehicle (211) to update the vehicle (211) over the air.

A portion of the ANN (225) responsible for the processing of images generated in the image sensing device (201) can be configured in the memory device (207) for the inference engine (208) of the image sensing device (201). The inference engine (208) processes images generated in the image sensing device (e.g., generated by the image sensor (209)) and causes the inferences results generated from the images to be transmitted from the image sensing device (201) to the ADAS (205). Thus, the data traffic from the sensing device (201) to the ADAS (205) can be reduced without sacrificing the quality of data inferred from the images.

FIG. 9 shows an autonomous vehicle (211) according to one embodiment. For example, the vehicle (211) in the system of FIG. 8 can be implemented using the autonomous vehicle (211) of FIG. 9.

In general, the vehicle (211) can include an infotainment system (249), a communication device (239), one or more sensors (e.g., 201), and a computer system (231) that is connected to some controls of the vehicle (211), such as a steering control (241) for the direction of the vehicle (211), a braking control (243) for stopping of the vehicle (211), an acceleration control (245) for the speed of the vehicle (211), etc. In some embodiments, the vehicle (211) in the system of FIG. 8 has a similar configuration and/or similar components.

The vehicle (211) of FIG. 9 is configured with an Advanced Driver Assistance System (ADAS) (205). The ADAS (205) of the vehicle (211) can have an Artificial Neural Network (ANN) (225) for object detection, recognition, identification, and/or classification, based on images generated in the image sensing device (201). An image processing portion of the ANN (225) can be implemented using the integrated image sensing device (201) of FIG. 7.

At least a portion of the ANN (225) is implemented in the image sensing device (201) using its integrated inference engine (208).

For example, a portion of the ANN (225) that operates based on the images generated in the image sensing device (201) can be stored in the image sensing device (201). The inference engine (208) performs the communication according to the portion of the ANN (225) such that the amount of communications from the imaging sensing device (201) to the computer system (231) of the vehicle (211) include neuron outputs and/or inference results from the portion of the ANN (225) implemented in the image sensing device (201), but not the image data of individual pixels.

In some implementations, the computation of the portion of the ANN (225) implemented in the image sensing device (201) does not depend on sensor data that is not generated in the image sensing device (201).

Alternatively, the computation of the portion of the ANN (225) implemented in the image sensing device (201) can further be based on sensor data not generated in the image sensing device (201). For example, the computer system (231) provides the sensor data to image sensing device (201) (e.g., by writing the sensor data into the memory device (207) through the communication interface (206)). By combining the sensor data provided by the computer system (231) and the image data generated by the image sensing device (201) according to the portion of the ANN (225) that is stored/implemented in the image sensing device (201), the amount of inference results from the image sensing device (201) can be reduced (e.g., in some ways of partitioning the ANN (225)). When data traffic of sending the relevant sensor data to the image sensing device (201) is smaller than the reduction in data size in inference results, sending the relevant sensor data for processing in the image sensing device (201) can be beneficial in reducing the overall communication traffic between the image sensing device (201) and the computer system (231) of the vehicle (211). Optionally, the selection of the portion of the ANN (225) for implementation in the image sensing device (201) can be based at least in part on the minimization of the data traffic between the image sensing device (201) and the computer system (231).

The computer system (231) of the vehicle (211) can include one or more processors (233), a data storage device (212), and memory (235) storing firmware (or software) (247), including the computer instructions and data models for ADAS (205).

Sensors of the vehicle (211) can include a visible light camera, an infrared camera, a lidar, radar, or sonar system, a peripheral sensor, a Global Positioning System (GPS) receiver, a satellite positioning system receiver, a brake sensor, and/or an airbag sensor. Further, the sensors of the vehicle (211) can include audio sensors (e.g., microphone) configured to monitor noises from various components and locations in the vehicle (211), a vibration sensor, a pressure sensor, a force sensor, a stress sensor, and/or a deformation sensor configured to measure loads on a component of the vehicle (211), accelerometers and/or gyroscope sensors measuring the motions of some components of the vehicle (211), etc. Such sensors can be used to monitor the operating status and/or health of the components for predictive maintenance.

The sensor(s) (e.g., 201) can provide a stream of real time sensor data to the computer system (231). The sensor data generated by an image sensing device (201) of the vehicle (211) can include an image that captures an object using a camera that images using lights visible to human eyes, or a camera that images using infrared lights, or a sonar, radar, or LIDAR system. Preferably, the image is processed by the inference engine (208) of the image sensing device (201) to generate inference results as the output of the image sensing device (201) and thus reduce or eliminate the need to transmit pixel image data to the computer system (231).

For example, a camera having the image sensing device (201) can be used to obtain roadway information for the travel of the vehicle (211), which can be processed by the ANN (225) to generate control signals for the vehicle (211). For example, a camera having the image sensing device (201) can be used to monitor the operation state/health of a component of the vehicle (211), which can be processed by the ANN (225) to predict or schedule a maintenance service.

The infotainment system (249) of the vehicle (211) can be used to present data and/or inference results from the image sensing device (201). For example, compressed images with reduced resolution and refreshing frequency can be generated in the image sensing device (201) and transmitted to the infotainment system (249) for presentation to an occupant of the vehicle (211). Optionally, the communication device (239) can establish a connection to a mobile device of an occupant of the vehicle (211) to make the presentation.

When the vehicle (211) is configured with an ADAS (205), the outputs of the ADAS (205) can be used to control (e.g., 241, 243, 245) the acceleration of the vehicle (211), the speed of the vehicle (211), and/or the direction of the vehicle (211), during autonomous driving.

Figure 10:
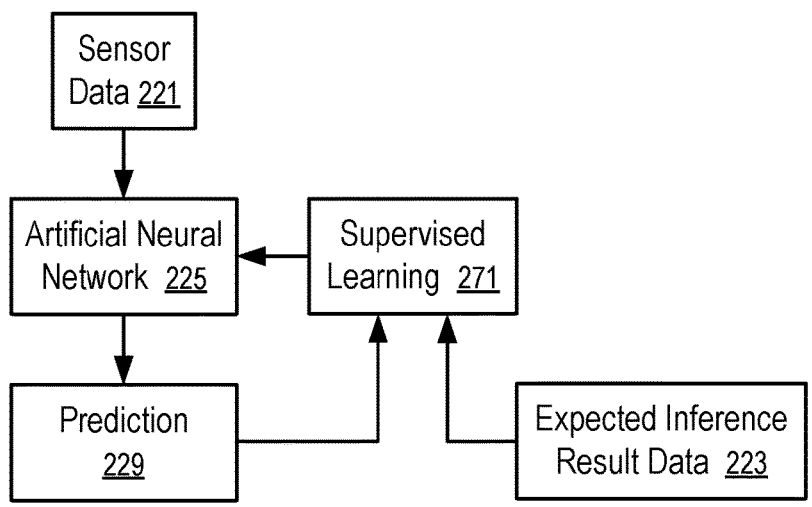
FIGS. 10-12 illustrate training of artificial neural networks for prediction according to some embodiments.
Figure 11:
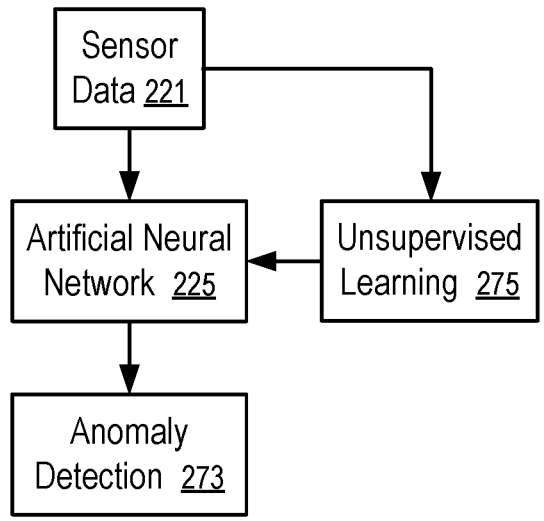
Figure 12:
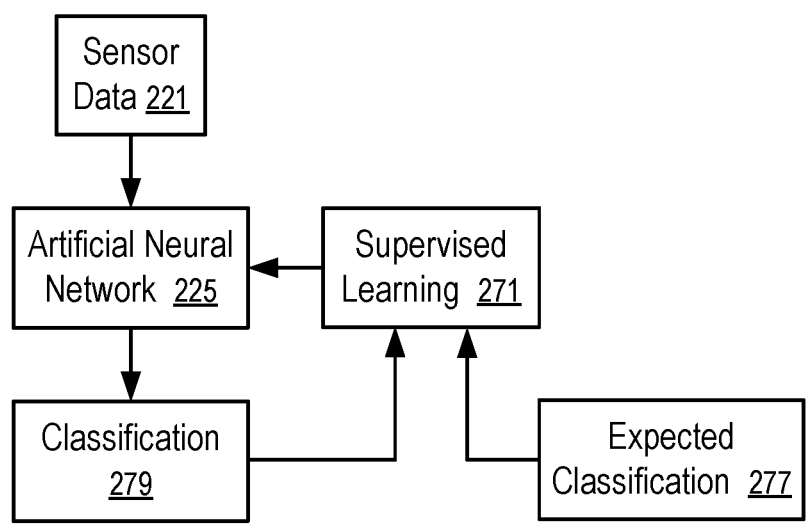

FIGS. 10-12 illustrate training of artificial neural networks (225) for prediction according to some embodiments.

In FIG. 10, a module (271) of supervised machine learning is used to train an artificial neural network (225) to minimize the differences between the prediction (229) generated from the sensor data (221) and the desired inference result data (223).

For example, the sensor data (221) can include an image showing an object; and the desired/expected inference result data (223) can identify an image region occupied by the object, a feature of the object, a classification of the object, an identity of the object, etc.

For example, the sensor data (221) can include an image surrounding of the vehicle (211); and the desired/expected inference result data (223) can include preferred control inputs for the steering control (241), the braking control (243), and the acceleration control (245).

The desired/expected inference result data (223) can be generated by a human operator. For example, the sensor data (221) can be used to construct a virtual reality demonstration of a situation encountered by the vehicle (211), including images from the image sensing device (201) showing an environment of the vehicle (211); and the desired/expected inference result data (223) can include responses generated by a human operator responsive to the virtual reality demonstration of the situation.

The supervised machine learning module (271) can adjust the artificial neural network (225) to reduce/minimize the difference between the prediction (229) generated based on the sensor data (221) and the desired/expected inference result data (223) generated by a human operator.

The supervised learning (271) of FIG. 9 can be applied in the server (219) based on the sensor data of a population of vehicles and corresponding desired/expected inference result data (223) to generate a generic ANN for the population of the vehicles.

The supervised learning (271) of FIG. 9 can be applied in the vehicle (211) based on the sensor data of the vehicle and inference result data (223) to generate a customized/personalized ANN (225). For example, a generic ANN (225) can be initially used in the vehicle (211); and the sensor data of the vehicle (211) and desired/expected inference result data (223) specific to the vehicle (211) can be used to further train the ANN (225) of the vehicle for customization/personalization of the ANN (225) in the vehicle (211).

In FIG. 11, a module (275) of unsupervised machine learning is used to train or refine an artificial neural network (225) to facilitate anomaly detection (273). The unsupervised machine learning module (275) is configured to adjust the ANN (e.g., SNN) to generate the normal classification, clustering, or recognized patterns in the sensor data (221) such that a degree of deviation from the normal classification, clustering, or recognized patterns in the sensor data (221) can be used to signal the detection (273) of anomaly.

For example, anomaly detection (273) can be used to preserve the sensor data (221) associated with anomaly for further analysis. In response to anomaly detection (273) in the vehicle (211), the computer system (231) can issue read command to the image sensing device (201) to retrieve image data associated with the anomaly from the image sensing device (201) and store the retrieved image data in the data storage device (212). The image data associated with the anomaly can be temporarily preserved in the memory device (207) of the image sensing device (201) and loaded to the data storage device (212) over a period of time using available communication bandwidth between the image sensing device (201) and the data storage device (212) without impacting the normal operations of the ADAS (205).

When the vehicle (211) is in the maintenance service facility (227), the image data (and other sensor data) associated with the anomaly can be retrieved from the data storage device (212) to generate desired/expected inference result data (223) for further training of the ANN (225) using a supervised learning (271) of FIG. 10.

Optionally, a supervised machine learning (271) can be used to train the ANN (225), as illustrated in FIG. 12. The supervised learning (271) can be used to minimize the classification differences between the predictions (279) made using the ANN (225) according to the sensor data (221) and the expected classification (277).

For example, in absence of an accident, a near accident event, or a user input indicating an abnormal condition, a classification of "normal" can be assumed. An accident, a near accident event, or a user input can be used to identify an expected classification of "abnormal" for the sensor data leading to the accident, event, or user input. The supervised machine learning (271) can be used to train the artificial neural network (225) to make the classification (279) with reduced/minimized differences from the expected classification (277).

Optionally, the integrated image sensing device (201) can be configured to accelerate the computations of a portion of the artificial neural network (ANN) (225) implemented via the inference engine (208).

For example, the inference engine (208) can include a neural network accelerator (259) specialized to perform at least part of the computations involving the artificial neural network (ANN) (225), such as dot-product of vectors and tensors, multiply and accumulation operations, etc. Optionally, some ANN processing not involving the images generated by the image sensor (209) can also be performed in the integrated image sensing device (201) (e.g., to reduce the computation load on the computer system (231) of the vehicle (211)).

The computations configured in the integrated image sensing device (201) can be used to reduce the amount of data to be transmitted to the processor(s) (233) to use or apply the ANN (225) and/or reduce the computation tasks of the processor(s) (233) in evaluating the outputs of the ANN (225) and/or in training the ANN (225). Such an arrangement can result in faster output from the integrated image sensing device (201) and/or lower energy usage, since the data would not have to be moved in and out of the integrated image sensing device (201) to a dedicated, standalone neural network accelerator. The computation capability of the integrated image sensing device (201) in processing data related to the ANN (225) enables the computer system (231) of the motor vehicle (211) to have computational resources and communication bandwidth for mission critical tasks (e.g., autonomous driving by the ADAS (205)).

Figure 13:
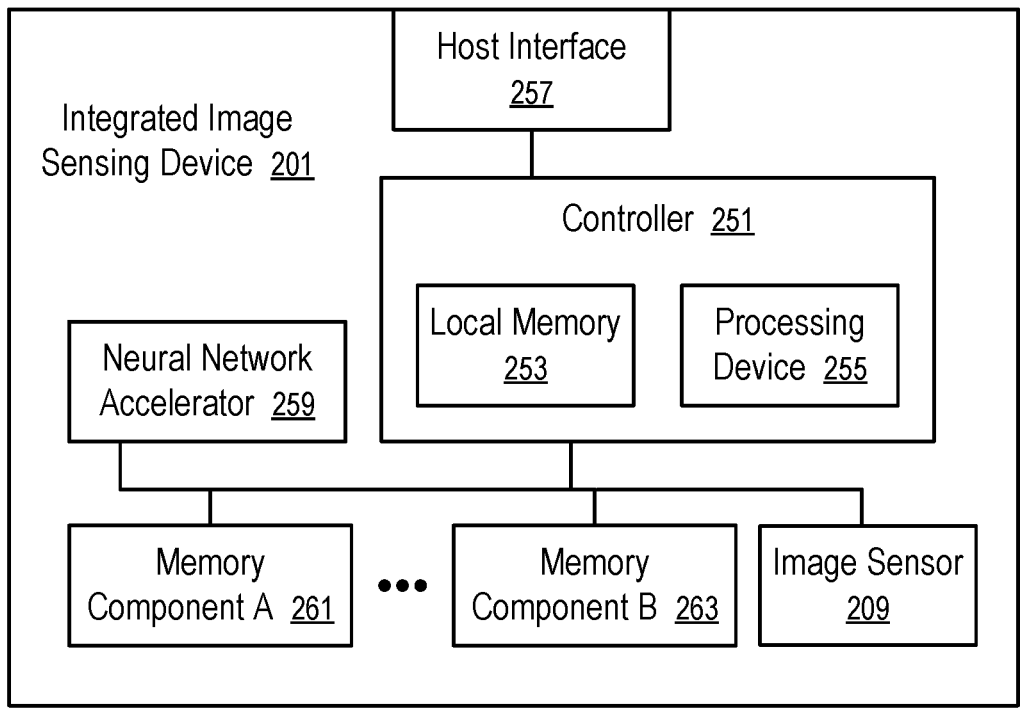
FIG. 13 shows an integrated image sensing device with a neural network accelerator according to one embodiment.

FIG. 13 shows an integrated image sensing device (201) with a neural network accelerator (259) according to one embodiment. For example, the integrated image sensing device (201) of FIG. 13 can be used to implement the image sensing device (201) of the vehicle (211) illustrated in FIG. 8 or 9.

In FIG. 13, the integrated image sensing device (201) has a host interface (257) configured to communicate with a host processor (e.g., 233 in FIG. 9) or a host system (e.g., 204 in FIG. 7). For example, the communication between the host processor (e.g., 233 or 204) and the host interface (257) can be, at least in part, in accordance with a communication protocol for a Peripheral Component Interconnect express (PCIe) bus, a Serial Advanced Technology Attachment (SATA) bus, a Universal Serial Bus (USB) bus, and/or a Storage Area Network (SAN).

For example, the host interface (257) can be configured to be similar to a host interface of a data storage device (e.g., 212).

For example, the host computer system (231 or 204) can communicate with the host interface (257) to retrieve inference results generated by the integrated image sensing device (201) from the images from the image sensor (209), instead of the images, to reduce the data traffic going through the host interface (257).

Optionally, the host interface (257) can be further used to receive, in the image sensing device (201), sensor data (221) generated by other sensors of the vehicle (211); and the sensor data (221) and the images from the image sensor (209) are combined in a portion of the ANN (225) that is implemented in the integrated image sensing device (201) to generate inference results.

In FIG. 13, each of the memory components (261 to 263) can be a memory integrated circuit configured to store data. The integrated circuit dies of the memory components (261 to 263) can be stacked to the back of the image sensor (209); and through-silicon vias between the image sensor (209) and the integrated circuit dies of the memory components (261 to 263) can be used to provide high communication bandwidth for storing the images generated by the image sensor (209) into at least some of the memory components (261 to 263) for processing by the controller (251) and/or the neural network accelerator (259). For example, different sections of the image sensor (209) can store image data to different memory components (261 to 263), or different sections of a memory component (e.g., 261 or 263), using through-silicon vias.

The neural network accelerator (259) and the controller (251) can be implemented via logic circuits formed on one or more integrated circuit dies that are further stacked on the integrated circuit dies of the memory components (261 to 263). Through-silicon vias between the integrated circuit die(s) of the neural network accelerator (259) and the controller (251) and the integrated circuit dies of the memory components (261 to 263) can be used to provide high communication bandwidth for processing the images stored in the memory components (261 to 263) to generate inference results. The inference results can be stored in the local memory (253) of the controller (251) and/or some of the memory components (261 to 263) for retrieval by the host system (204), such as the computer system (231) of the vehicle (211). For example, different memory components (261 to 263), or different sections of a memory component (e.g., 261 or 263), can use through-silicon vias to facilitate parallel access for different portions of the neural network accelerator (259), the controller (251), and the image sensor (209).

In general, some memory integrated circuits are volatile and require power to maintain the stored data; and some memory integrated circuits are non-volatile and can retain the stored data even when not powered. The memory components (261 to 263) can include volatile memory and/or non-volatile memory. The memory components (261 to 263) can implement different types of memory or a same type of memory.

Examples of non-volatile memory include flash memory, memory units formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two layers of wires running in perpendicular directions, where wires of one layer run in one direction in the layer is located above the memory element columns, and wires of the other layer is in another direction and in the layer located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

The integrated image sensing device (201) can have a controller (251) that includes volatile local memory (253) and at least one processing device (255).

The local memory of the controller (251) can be an embedded memory configured to store instructions for performing various processes, operations, logic flows, and routines that control operation of the processing device (255), including handling communications between the integrated image sensing device (201) and the processor(s) (e.g., 233) of the vehicle (211), and other functions described herein. Optionally, the local memory (251) of the controller (251) can include Read-Only Memory (ROM) for storing micro-code and/or memory registers storing, e.g., memory pointers, fetched data, etc., and/or volatile memory, such as Dynamic Random-Access Memory (DRAM) and Static Random-Access Memory (SRAM).

In FIG. 13, the integrated image sensing device (201) includes a neural network accelerator (259) coupled to the controller (251) and/or the memory components (261 to 263).

For example, the neural network accelerator (259) can be configured to perform matrix arithmetic computations more efficiently than the processing device (255) of the controller (251). The computations involving ANN (225) have matrix multiplication and accumulation operations, which can be computational intensive for a generic processor (e.g., 233, 255). Using the neural network accelerator (259) to perform the matrix arithmetic computations can reduce the data to be transmitted to the processor(s) (233) of the vehicle (211) and reduce the computation workload for the processor(s) (233, 255).

When the ANN (225) includes a Spiking Neural Network (SNN), the simulation of the differential equation(s) for controlling the activation level of SNN neurons can be computationally intensive for a generic processor (e.g., 233, 255). Optionally, the neural network accelerator (259) can use special hardware to simulate the differential equation(s) and thus improve the computational efficiency in implementing the SNN.

In some implementations, the neural network accelerator (259) is an integrated circuit device separate from the controller (251) and/or the memory components (261 to 263). Alternatively, or in combination, a neural network accelerator (259) is integrated with the controller (251) in an integrated circuit die. Alternatively, or in combination, a portion of the neural network accelerator (259) can be integrated on the integrated circuit die(s) of at least one of the memory components (261 to 263), as illustrated in FIG. 14.

Figure 14:
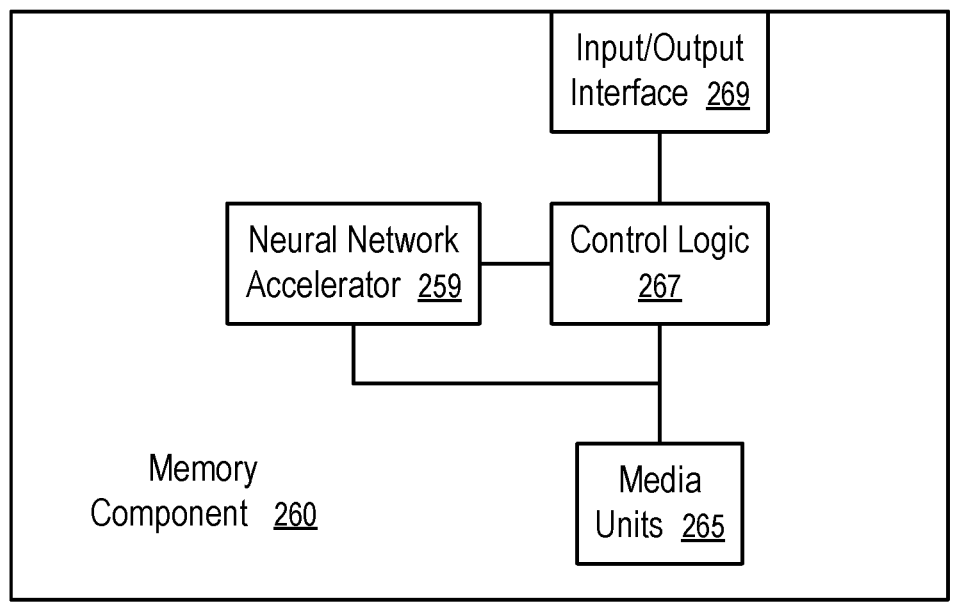
FIG. 14 shows a memory component to accelerate neural network computations according to one embodiment.

FIG. 14 shows a memory component (260) to accelerate neural network computations according to one embodiment. For example, each or some of the memory components (261 to 263) in FIG. 13 can be implemented using a memory component (260) of FIG. 14.

In FIG. 14, the memory component (260) can be formed on an integrated circuit die. An input/output (I/O) interface (269) of the memory component (260) is configured to process input/output signals for the memory component (260). For example, the input/output signals can include address signals to specify locations in the media units (265) and data signals representing data to be written in the media units (265) at the locations specified via the address signals, or data retrieved from the locations in the media units (265).

In FIG. 14, a neural network accelerator (259) is coupled with the control logic (267) and/or the media units (265) to perform computations that are used in the evaluation of the output of a portion of an ANN (225) and/or in the training of the ANN (225).

For example, the input/output interface (269) can receive addresses that identify matrices that are stored in the media units and that are to be operated upon via the neural network accelerator (259). The memory component (260) can provide the computation results of the neural network accelerator (259) as the output data responsive to the addresses, store the output data in a buffer for further operations, store the output data into a location in the media units (265) specified via the address signals. Thus, the computations performed by the neural network accelerator (259) can be within the memory component (260), which is close to the media units (265) in which the matrix data is stored.

For example, the state data of SNN neurons can be stored in the media units (265) according to a predetermined pattern. The neural network accelerator (259) can automatically update the states of the SNN neurons according to the differential equation(s) for controlling the activation level of SNN neurons over time. Optionally, the neural network accelerator (259) is configured to process spiking of neurons in the neural network. Alternatively, the neural network accelerator (259) of the integrated image sensing device (201) and/or the processor(s) (233) can be configured to process the spiking of neurons and/or accumulation of inputs to the SNN.

For example, the image sensor (209) generates images at a predetermined frequency. Each image is stored into the memory components (261 to 263) in a cyclic way where the newest image writes over the oldest image. The memory components (261 to 263) further store a portion of ANN (225) of the vehicle (211) responsible for processing of the images from the image sensor (209). The controller (251) processes the images in the memory components (261 to 263) according to the portion of ANN (225) to generate inference results. The inference results are stored in the memory components (261 to 263) and/or in the local memory (253) of the controller (251) for reading by the host system (204), such as the computer system (231) of the vehicle (211).

Optionally, the integrated image sensing device (201) further receives a sensor data stream from at least one sensor configured on the vehicle (211) and generate the inference results based on the sensor data stream and the images from the image sensor (209) according to the portion of ANN (225) stored in the memory components (261 to 263).

A neural network accelerator (259) configured within the integrated image sensing device (201) performs at least a portion of computations based on an artificial neural network (225), the images from the image sensor (209), and the sensor data stream.

Optionally, the neural network accelerator (259) can be configured on an integrated circuit die that is separate from a controller (251) and/or separate from the memory components (261 to 263).

Optionally, the neural network accelerator (259) can be configured on an integrated circuit die that includes a controller (251) of the integrated image sensing device (201), or memory component (260, 261 or 263) of the integrated image sensing device (201).

The neural network accelerator (259) can be configured to perform computations, such as matrix arithmetic computations for ANN and/or differential equation simulations for SNN, using data stored in the integrated image sensing device (201).

Examples of the matrix arithmetic computations include matrix multiplication and accumulation operations. After a computation to generate a result of the matrix arithmetic computations using a data stored in the integrated image sensing device (201), the neural network accelerator (259) can provide the result as output of the integrated image sensing device (201) in data retrieval operations (e.g., in response to a read command). Alternatively, or in combination, the result of the matrix arithmetic computation can be buffered in the integrated image sensing device (201) as operand for a next matrix computation performed in combination with a matrix of data retrieved from the non-volatile memory via a read command received in the host interface (257).

When the Artificial Neural Network (ANN) (225) includes a Spiking Neural Network (SNN), the neural network accelerator (259) can be configured to simulate a differential equation controlling activation levels of neurons in the Spiking Neural Network (SNN). Optionally, the memory component (260) is configured to store states of the neurons in the spiking neural network according to a predetermined pattern; and the neural network accelerator is configured to automatically update the states of the neurons over time according to the differential equation. For example, the neural network accelerator (259) can be configured to train the Spiking Neural Network (SNN) via unsupervised machine learning to detect anomaly.

The computations performed by the neural network accelerator (259) according to an Artificial Neural Network (ANN) (225) involve different types of data that have different patterns of usages of the integrated image sensing device (201).

For example, making a prediction using the Artificial Neural Network (ANN) (225) includes the use of data specifying the model of the Artificial Neural Network (ANN) (225), input data provided to the artificial neurons, and output data generated by the artificial neurons.

The memory capacity of the integrated image sensing device (201) can be partitioned into different portions for the different types of ANN-related data. The different portions can be separately configured to optimize the access and storage of the corresponding data according to their patterns of usages by the neural network accelerator (259) and/or the processor(s) (233) of the computer system (231) in which the integrated image sensing device (201) is configured.

The model of the Artificial Neural Network (ANN) (225) can include the parameters specifying the static attributes of individual artificial neurons in the ANN (225) and the neuron connectivity in the ANN (225). The model data of the ANN (225) is static and does not change during the prediction calculation made using the ANN (225). Thus, the usage pattern of the model data is mostly read. However, the model data of the ANN (225) can change when an updated ANN (225) is installed. For example, the vehicle (211) can download an updated ANN (225) from the server (219) to the integrated image sensing device (201) of the vehicle (211) to update its prediction capability. The model data of the ANN (225) can also change during or after the training of the ANN (225) using a machine learning technique (e.g., 271 or 275). It is preferred to configure a separate memory partition or region of the integrated image sensing device (201) to store the model data, where the partition or region is operated according to configuration parameters that optimize the memory units for the specific usage patterns of the model data (e.g., mostly read, infrequent update). For example, when the memory units are implemented using a flash memory based on NAND logic gates, the memory units in the ANN model partition/region can be configured to operate in a Multi-Level Cell (MLC) mode, a Triple Level Cell (TLC) mode, or a Quad-Level Cell (QLC) mode, wherein each memory cells stores two, three, or four bits for increased storage capability.

Input data provided to the artificial neurons in the ANN (225) can include external inputs and internal inputs. The external inputs are generated typically by the sensors (e.g., 209) of the vehicle (211) but not by artificial neurons in the ANN (225). The external inputs can be saved in a cyclic fashion so that the input data of the most recent time period of a predetermined length of driving can be found in the integrated image sensing device (201). Thus, it is preferred to configure a separate memory partition or region of the integrated image sensing device (201) to store the external input data, where the partition or region is operated according to configuration parameters that optimize the memory units for the storage pattern of the external input data (e.g., enhanced endurance, cyclic overwrite). For example, when the memory units are implemented using a flash memory based on NAND logic gates, the memory units in the ANN input partition/region can be configured to operate in a Single Level Cell (SLC) mode, where each memory cell stores one bit of data for improved endurance in cyclic overwriting operations.

In some implementations, artificial neurons can have state variables that change over time in response to inputs during prediction calculations. For example, the activation level of a spiking neuron can change over time and is considered a dynamic state variable of the spiking neuron. In some implementations, such state variable data of artificial neurons has a similar storage usage pattern as the external input data; and thus, the state variable data can be stored in the partition or region configured for the external input data. In other implementations, the state variable data of artificial neurons is kept in a buffer and stored less frequently than the external inputs; and thus, another partition/region can be configured for storing the dynamic state variable data of artificial neurons.

Output data generated by the artificial neurons in the ANN (225) can be buffered for further access by the neural network accelerator (259) and/or the processor(s) (233) of the computer system (231). The output data can include external outputs and internal outputs. The external inputs are generated by artificial neurons as the output from the ANN (225), such as the results of classifications or predictions made by the ANN (225). The output of the ANN (225) is typically further processed by the processor(s) (233) of the computer system (231). The external inputs may be saved periodically (e.g., in a way similar to the storing of the state variable data). The internal outputs and/or some of the external outputs can be internal inputs to artificial neurons in the ANN (225). In general, it may not be necessary to store the internal outputs from the buffer of the data storage device to the memory components. In some implementations, when the buffer capability of the integrated image sensing device (201) is insufficient to hold the entire state variable data and/or the internal outputs, the integrated image sensing device (201) can use a swap partition/region to extend the capacity of the buffer. The swap partition/region can be configured for optimized random access and for improved endurance.

External outputs and/or dynamic states of neurons can be saved in a separate output partition or region, in a cyclic way so that the external output data and/or dynamic states of the neurons can be periodically stored, and the most recent sets of the external outputs and/or dynamic states can be found in the integrated image sensing device (201). External outputs and/or dynamic states of neurons can be stored selectively, since some of such data can be re-generated by the ANN from the external inputs stored in the input partition or region. Preferably, the output partition or region is configured to store one or more sets of external outputs and/or dynamic states that cannot be created from the external inputs stored in the input partition or region. In storing data in a cyclic way in an input/output partition or region, the oldest stored data sets are erased to make rooms for the most recent data sets. The ANN input/output partition/region can be configured for an optimized sequential write stream for copying data from the buffer of the data storage device into the memory units in the memory components of the data storage device.

FIG. 15 shows a memory capacity (281) configured to support neural network computations according to one embodiment. For example, the memory capacity (281) of the memory components (261 to 263) of the integrated image sensing device (201) of FIG. 13 can be configured according to FIG. 15 to support neural network computations.

The storage capacity (281) of FIG. 15 can be implemented using a set of memory components (e.g., 261 to 263) of the integrated image sensing device (201).

A set of regions (283, 285, 287, . . . ) can be created on the storage capacity (281) of the integrated image sensing device (201). Each of the region (e.g., 283, 285, or 287) corresponds to a named portion of the storage capacity (281). Logical addresses are defined within each region. An address map (291) is configured to map between the logical addresses defined in the regions (283, 285, 287, . . . ) to the physical addresses of memory units in the memory components (e.g., 261 to 263 illustrated in FIG. 13).

The address map (291) can include region optimization settings (292) for the regions (283, 285, and 287).

For example, an ANN model region (283) can be a memory/storage partition configured for the model data of the Artificial Neural Network (ANN) (225). The region optimization settings (292) optimizes the memory operations in the ANN model region (283) according to the data usage pattern of ANN models (e.g., mostly read, infrequent update centric).

For example, a neuron input region (285) can be a memory/storage partition configured for the external input data to the Artificial Neural Network (ANN) (225). The region optimization settings (292) optimizes the memory operations in the neuron input region (285) according to the data usage pattern of the external input data (e.g., for enhanced endurance supporting cyclic overwrite of continuous input data flow for sequential writes).

For example, a neuron output region (287) can be a memory/storage partition configured for the external output data provided from the Artificial Neural Network (ANN) (225). The region optimization settings (292) optimizes the memory operations in the neuron output region (287) according to the data usage pattern of the external output data (e.g., improved endurance for periodically overwrite of data with random read/write access).

The integrated image sensing device (201) includes a buffer configured to store temporary/intermediate data of the Artificial Neural Network (ANN) (225), such as the internal inputs/outputs of the artificial neurons in the ANN (225).

Optionally, a swap region can be configured in the storage capacity (281) to extend the capacity of the buffer (252).

Optionally, the address map (291) includes a mapping between logic memory addresses received in the host interface (257) to access data of artificial neurons and the identities of the artificial neurons. Thus, a read or write command to access one type of data of an artificial neuron in one region can cause the controller 251 to access another type of data of the artificial neuron in another region.

For example, in response to a request to write external input data for a neuron into the storage capacity (281) of the data storage device (285), the address map (291) can be used to calculate the addresses of the model parameters of the neuron in the ANN model region (283) and read the model parameters into the buffer (252) to allow the neural network accelerator (259) to perform the computation of the output of the neuron. The output of the neuron can be saved in the buffer (252) as the internal input to other neurons (e.g., to reduce write amplification). Further, the identities of the other neurons connected to the neuron can also be retrieved from the ANN model region (283) into the buffer (252), which allows the neural network accelerator (259) and/or the processor to further process the propagation of the output in the ANN (225). The retrieval of the model data from the ANN model region (283) can be performed in parallel with the storing of the external input data into the neuron input region (285). Thus, the processors (233) of the computer system (231) of the vehicle (211) do not have to explicitly send in read commands for the retrieval of the model data from the ANN model region (283).

Similarly, in response to reading output data of a neuron, the address map (291) can be used to compute the addresses of the model parameters of the neuron stored in the ANN model region (283) and read the model parameters into the buffer (252) to allow the neural network accelerator (259) to apply internal inputs in the buffer (252) to the perform the computation of the output of the neuron. The computed output can be provided as a response to the reading of the output data for the neuron, without the integrated image sensing device (201) having to store the output data in the memory components (e.g., 261 to 263). Thus, the processors (233) and/or the neural network accelerator (259) can control the computations of the neuron via writing inputs to neurons and/or reading outputs from neurons.

In general, incoming external input data to the ANN (225) can be raw sensor data (221) generated directly by the sensors (e.g., 209) without processing by the processors (233) and/or the neural network accelerator (259). Alternatively, indirect sensor data (221) that has processed by the processors (233) for the ANN (225) from the signals from the sensors (201) can be provided as the external input data. The incoming external input data can be accepted in the host interface (257) and written in a cyclic way into the neuron input region (285), and automatically buffered in the buffer (252) for neural network accelerator (259) to generate neuron outputs using the model stored in the ANN model region (283). The outputs generated by the neural network accelerator (259) can be further buffered as internal inputs for further application of the model in the ANN model region (283). When the external outputs become available, the integrated image sensing device (201) can report the completion of the write requests with an indication of the availability of the external outputs. Optionally, the controller 251 and/or the neural network accelerator (259) can generate internal read commands to propagate signals in the ANN (225) in generating the external outputs. Alternatively, the host processors (233) can control the propagation of signals in the ANN (225) by selectively reading outputs of neurons; and the integrated image sensing device (201) can actively buffer data that may be needed in the buffer (252) to accelerate the ANN computation.

FIG. 16 illustrates the configuration of a memory region (283) for an Artificial Neural Network (ANN) model according to one embodiment. For example, the configuration of FIG. 16 can be implemented in the integrated image sensing device (201) of FIG. 13 with a logical memory capacity (281) of FIG. 15. For example, the settings (293) of FIG. 16 can be part of the region optimization settings (292) of FIG. 15.

The configuration of FIG. 16 maps an ANN model region (283) to at least one memory component A (261). Preferably, the at least one memory component A (261) can be used by the controller (251) in parallel with memory components (e.g., 263) that hosts the other regions (e.g., 285 and 287) of ANN data. For example, the memory component A (261) can be in an integrated circuit package that is separate from the integrated circuit packages for the other regions (e.g., 285 and 287). Alternatively, the memory components (261 to 263) are formed on separate integrated circuit dies embedded in a same integrated circuit package. Alternatively, the memory components (261 to 263) can be formed on separate regions of an integrated circuit die, where the separate regions can be operated substantially in parallel (e.g., for read, for erase, and/or for write).

In FIG. 16, the settings (297) are optimized to the usage pattern of mostly read and infrequent update.

FIG. 17 illustrates the configuration of a region (285) for the inputs to artificial neurons according to one embodiment. For example, the configuration of FIG. 16 can be implemented in the integrated image sensing device (201) illustrated in FIGS. 13 and/or 15. For example, the settings (295) of FIG. 16 can be part of the region optimization settings (292) of FIG. 15.

The configuration of FIG. 17 maps a neuron input region (285) to at least one memory component B (263). Preferably, the at least one memory component B (263) can be used by the controller (251) in parallel with memory components (e.g., 261) that hosts the other regions (e.g., 283 and 287) of ANN data. For example, the memory component B (263) can be in an integrated circuit package that is separate from the integrated circuit packages for the other regions (e.g., 283 and 287). Alternatively, the memory components (261 to 263) are formed on separate integrated circuit dies embedded in a same integrated circuit package. Alternatively, the memory components (261 to 263) can be formed on separate regions of an integrated circuit die, where the separate regions can be operated substantially in parallel (e.g., for read, for erase, and/or for write).

In FIG. 17, the settings (297) are optimized to the usage pattern of enhanced endurance in cyclic sequential overwrite in recording a continuous stream of input data that is sampled at a fixed time interval.

FIG. 18 illustrates the configuration of a region (287) for the outputs from artificial neurons according to one embodiment. For example, the configuration of FIG. 16 can be implemented in the integrated image sensing device (201) illustrated in FIGS. 13 and/or 15. For example, the settings (297) of FIG. 16 can be part of the region optimization settings (292) of FIG. 15.

The configuration of FIG. 18 maps a neuron output region (287) to at least one memory component C (262). Preferably, the at least one memory component C (262) can be used by the controller (251) in parallel with memory components (e.g., 261 and 263) that hosts the other regions (e.g., 283 and 285) of ANN data. For example, the memory component C (262) can be in an integrated circuit package that is separate from the integrated circuit packages for the other regions (e.g., 283 and 285). Alternatively, the memory components (261 to 263) are formed on separate integrated circuit dies embedded in a same integrated circuit package. Alternatively, the memory components (261 to 263) can be formed on separate regions of an integrated circuit die, where the separate regions can be operated substantially in parallel (e.g., for read, for erase, and/or for write).

In FIG. 18, the settings (297) are optimized to the usage pattern of buffered data for periodic overwrite with random access. For example, memory units are configured via the optimization settings (293 to 297) to update/overwrite in the neuron output region (287) at a frequency higher than in the ANN model region (283), but lower than in the neuron input region (285).

A communication protocol/interface can be configured to allow an integrated image sensing device to perform neural network acceleration on the fly with reduced data traffic to the host system (204).

For example, the host processor (e.g., 233) of a vehicle (211) can provide write commands to the integrated image sensing device (201) to store the model of an artificial neural network in a model partition (e.g., 283).

To use the ANN model in classifications and/or predictions, the host processor (e.g., 233) of a vehicle (211) can optionally stream input data for the ANN (225) into the neuron input partition (e.g., 285). The neural network accelerator (259) of the storage device (212) can automatically apply the images from the image sensor (209) and, if there is any, the input data from the host processor (233) to the model stored in ANN model partition (e.g., 283) in accordance with the address map (291). The integrated image sensing device (201) makes the computed outputs available for propagation in the ANN (225). Preferably, the computed outputs are made available to the neural network accelerator (259) through the buffer (252) without the need to store the intermediate outputs into memory components (e.g., 261 to 263). Thus, the data communications between the host processor (e.g., 233) and the integrated image sensing device (201) for the transporting of outputs of neurons can be reduced. When the outputs have propagated to the output neurons in the ANN (225), the integrated image sensing device (201) can provide a response to a request from the host processor (e.g., 233). The response indicates that the external output from neurons in the ANN (225) is available. In response, the host processor (e.g., 233) of a vehicle (211) can optionally issue read commands to retrieve the external outputs for further processing.

Figure 19:
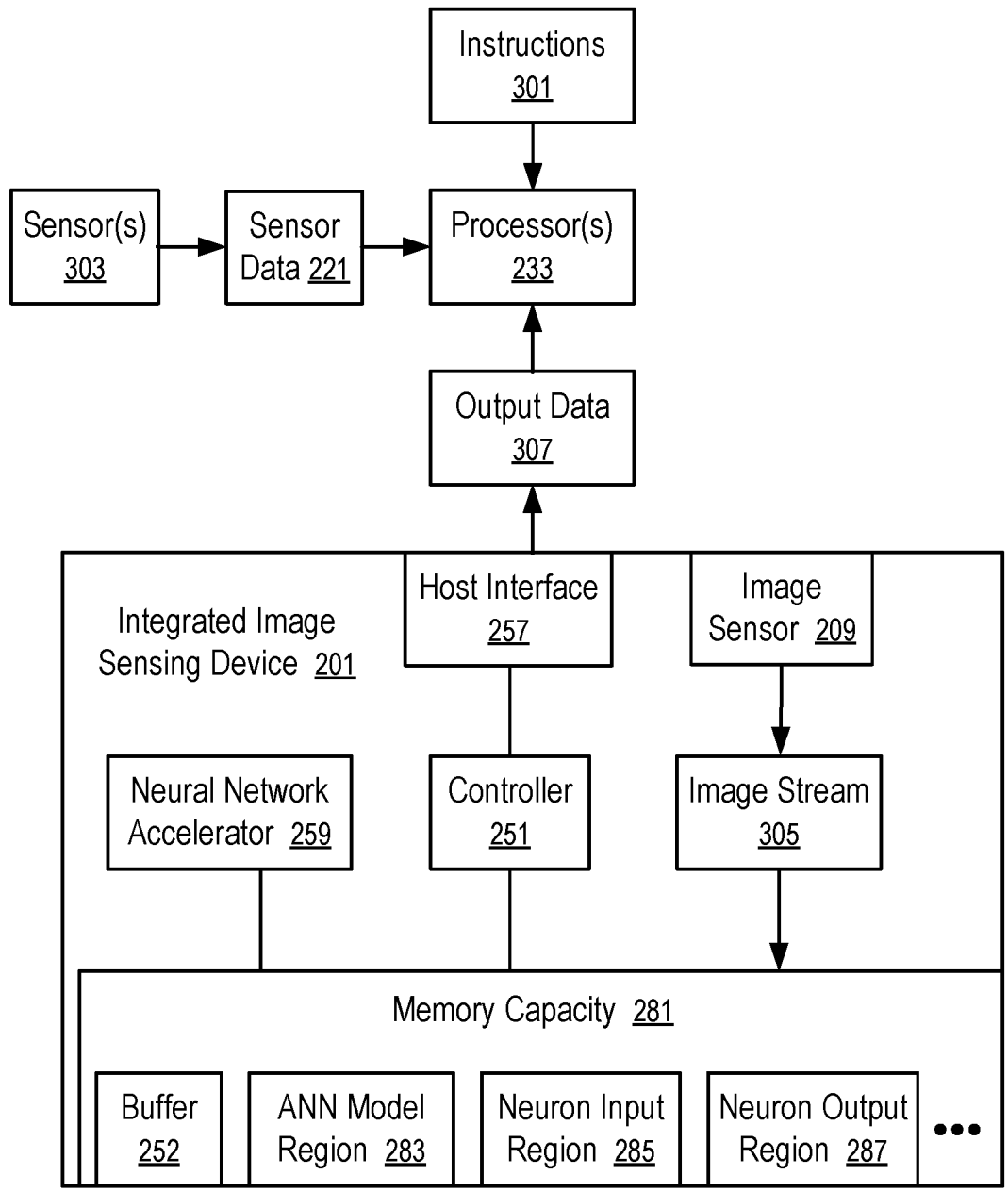
FIG. 19 shows communications between a host system and an integrated image sensing device according to one embodiment.

FIG. 19 shows communications between a host system (e.g., 204) and an integrated image sensing device (201) according to one embodiment. For example, the communications as illustrated in FIG. 19 can be implemented in the vehicle (211) of FIG. 8 or 9, with an integrated image sensing device (201) illustrated in FIG. 7, or 13.

In FIG. 19, the processor(s) (233) of the host system (e.g., 204) can be configured with a simplified set of instructions (301) to perform neural network computation, since some of the computations involving the ANN (225) is performed by the neural network accelerator (259) within the integrated image sensing device (201). It is not necessary to transport the image stream (305) and the model data back to the processor(s) (233) during the use of the ANN (225) for predictions and/or classifications.

The image sensor (209) can generate a continuous image stream (305) as part of sensor data (221) for the vehicle (211). The images in the stream (305) can be generated at a fixed, predetermined time interval (e.g., during the operation of the vehicle (211)).

The image stream (305) is applied to input neurons in the ANN (225). Input neurons in the ANN (225) are configured to accept external inputs to the ANN (225); and output neurons are configured to provide external outputs from the ANN (225).

Optionally, the vehicle (211) can have further sensor(s) (303) configured to generate sensor data (221).

The processor(s) (233) can execute the instructions (301) to process the output data (307) from the integrated image sensing device (201) and the sensor data (221).

Optionally, the processor(s) (233) can write the sensor data (221) into the neuron input region (285) to obtain the output data (307) that is based on both the sensor data (221) and the image stream (305).

The integrated image sensing device (201) stores the image stream (305) (and optionally the sensor data (221)) into the neuron input region (285) in a cyclic way where the oldest input set corresponding to the oldest time instance of data sampling for data sets currently stored in the neuron input region (285) is erased to store the newest set of inputs.

For each input data set, the neural network accelerator (259) applies the model of the ANN (225) stored in the ANN model region (283). The neural network accelerator (259) (or the processor(s) (233)) can control the propagation of signals within the neural network. When the output neurons of the ANN (225) generate their outputs responsive to the input data set, the integrated image sensing device (201) can provide to the processor (233) an indication that the neuron output are ready for retrieval. The indication can be configured in a response to the request from the processor(s) (233) to write the input data set into the neuron input region (285). The processor(s) (233) can optionally retrieve the output data (307) (e.g., in accordance with conditions and/or criteria programmed in the instructions).

In some embodiments, a trigger parameter is configured in the integrated image sensing device (201). When an output parameter in the external output (317) meets a requirement specified by the trigger parameter, the data storage device provides the response to the request from the processor(s) (233) to write the input data set into the neuron input region (285).

Figure 20:
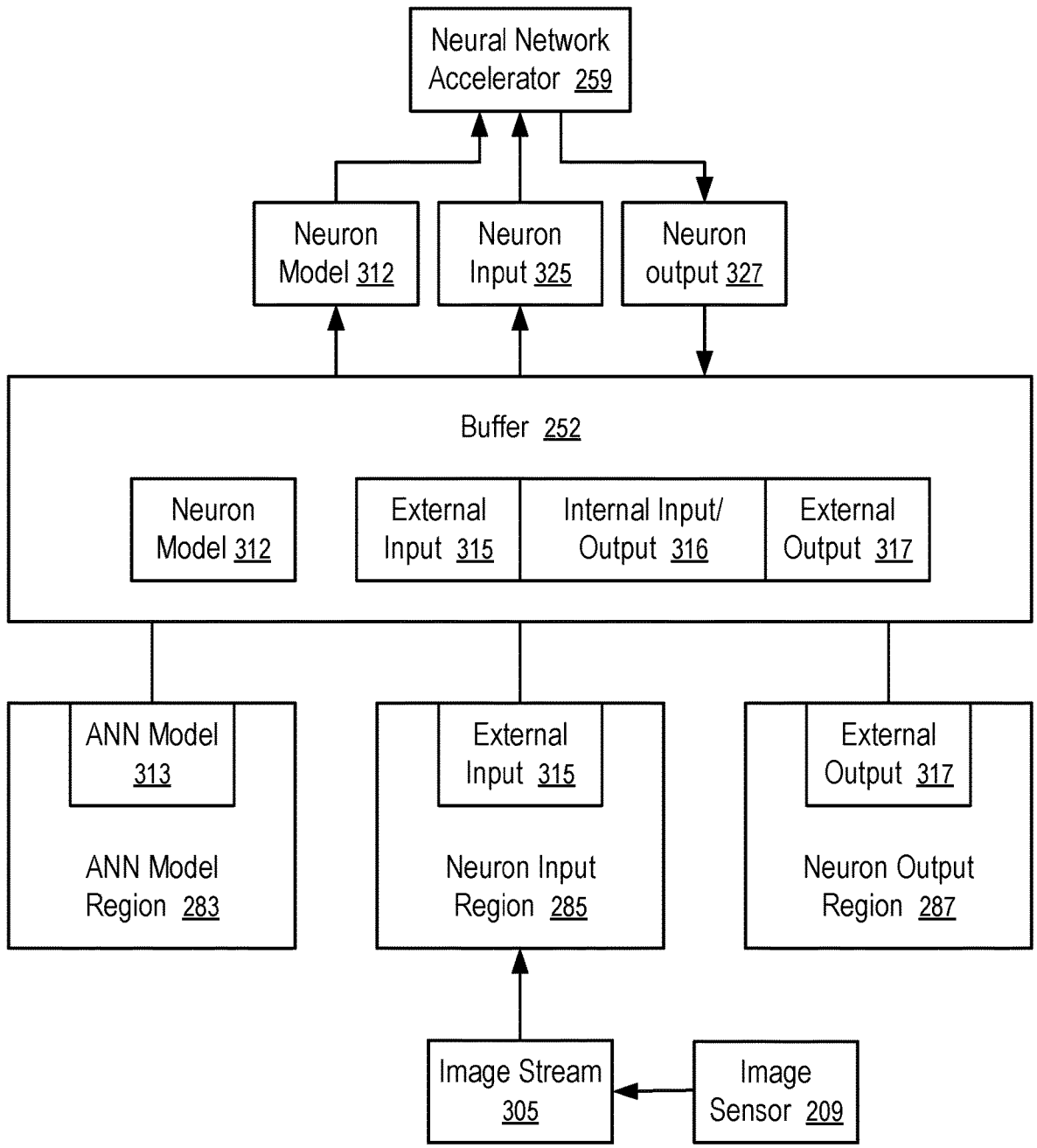
FIG. 20 shows communications within an integrated image sensing device according to one embodiment.

FIG. 20 shows communications within an integrated image sensing device (201) according to one embodiment. For example, the communications of FIG. 20 can be implemented an integrated image sensing device (201) illustrated in FIG. 7 or 13, in connection with the communications with the host system (204) as illustrated in FIG. 7.

In FIG. 20, the model region (283) stores the model (313) of an ANN (225). In response to receiving a set of external input (315) for a time instance from the input stream (305) in the buffer (252), the integrated image sensing device (201) can write the external input (315) into the input region (285) in parallel with retrieving a neuron model (312) containing a portion of the ANN model (313) corresponding to the parameters of the input neurons and/or the identities of neurons connected to the input neurons. The buffer (252) allows the neural network accelerator (259) to combine the neuron model (312) and the external input (325) to generate the output (327) of the input neurons.

In general, the neuron output (327) can include a portion that is the internal output (316) for further propagation within the ANN (225) and/or a portion that is the external output (317) for the processor(s) (233).

The internal output (316) is stored in the buffer (252) as internal input (316) for further propagation in the ANN (225) in a way similar to the generation of neuron outputs (327) from the external input (315). For example, a portion of the internal input (316) can cause the controller (251) and/or the neural network accelerator (259) to retrieve corresponding neuron model (312) relevant to the internal input such that the internal input is applied in the neural network accelerator (259) to the corresponding neuron model (312) to generate their neuron outputs (327).

When the complete set of external output (317) is available in the buffer (252), the external output (317) can be stored into the output region (287).

Optionally, the storage device (212) does not store each set of external output (317) corresponding to a set of stored external input (315) sampled at a time instance. For example, the storage device (212) can be configured to store one set of external output (317) every time when a predetermined number of sets of external input (e.g., 315) has been counted. Alternatively, or in combination, the processor(s) (233) can determine whether or not to store the external output (317). For example, the storage device (212) can be configured to store the external output (317) in response to the processor(s) (233) retrieving the external output (317) for further processing. For example, the storage device (212) can be configured to store the external output (317) in response to a write command from the processor(s) (233) after the processing of the external output (317) in the processor(s) (233).

The server (219), the computer system (231), the host system (204), the data storage device (212), and/or the integrated image sensing device (201) can each be implemented as one or more data processing systems.

The present disclosure includes methods and apparatuses which perform the methods described above, including data processing systems which perform these methods, and computer readable media containing instructions which when executed on data processing systems cause the systems to perform these methods.

In one example disclosed herein, an integrated circuit device includes: an image sensor; image signal processing (ISP) application-specific integrated circuit (ASIC); dynamic random access memory (DRAM); a substrate having interconnect between the ISP ASIC and DRAM; and a camera serial interface. The ISP ASIC is configured to store intermediate image processing data in the DRAM and, for each respective pixel, generate image data based on intermediate image processing data of a section of pixels surrounding the pixel; and the camera serial interface is configured to provide the image data of the respective pixel. For example, the ISP ASIC is configured to perform warping detection, warping correction, color correction, deblurring, or noise reduction, or any combination thereof.

In another example, an integrated circuit device includes: an image sensor configured to generate a first image stream; an artificial intelligence (AI) engine configured to generate a second image stream from the first image stream; memory coupled between the AI engine and the image sensor; and a camera serial interface configured to provide the second image stream. The AI engine can be optionally configured to identify portions of images in the first image stream and generate the second image stream by zooming in to the portions. For example, the portions can be identified via object recognition using an artificial neural network.

In a further example, a solid state drive includes: an image sensor configured to generate an image stream; an artificial intelligence (AI) engine configured to generate inference results from the image stream; memory configured to store the inference results; and a Non-Volatile Memory express (NVMe) interface configured to receive read commands from a host system to retrieve inference results from the memory without the host system issuing write commands to write the inference results into the memory. The solid state drive can be optionally configured to have a ball grid array form factor and/or as a single chip solid state drive. For example, at least a portion of the memory can be non-volatile; and the solid state drive can be optionally configured to have a portion of a function of a black box data recorder of an autonomous vehicle. Optionally, the solid state drive can include a controller configured to perform garbage collection and wear leveling in the solid state drive.

In yet another example, an integrated circuit device includes: an image sensor configured to generate a first image stream; an artificial intelligence (AI) engine configured to generate, from the first image stream, a second image stream and inference results; memory coupled between the AI engine and the image sensor to store the inference results; a camera serial interface configured to provide the second image stream; and a host interface configured to receive read commands to retrieve the inference results.

In a further example, an integrated circuit device includes: an image sensor configured to generate an image stream; an artificial intelligence (AI) engine configured to generate inference results from the image stream; memory coupled between the AI engine and the image sensor; and an interface to an external solid state drive using an NVMe protocol. For example, the integrated circuit device can optionally include a camera serial interface configured to provide an image stream generated by the AI engine. For example, the external solid state drive can be a black box data recorder of an autonomous vehicle.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An integrated circuit device, comprising:
an image sensor;
image signal processing application-specific integrated circuit;
dynamic random access memory;
a substrate having an interconnect directly between the image signal processing application-specific integrated circuit and the dynamic random access memory; and
a camera serial interface;
wherein the image signal processing application-specific integrated circuit ISP ASIC is configured to store intermediate image processing data in the dynamic random access memory and, for each respective pixel, generate image data based on intermediate image processing data of a section of pixels surrounding the pixel;
wherein the camera serial interface is configured to provide the image data of the respective pixel; and
wherein the integrated circuit device is configured within an integrated circuit package.

2. The integrated circuit device of claim 1, wherein the image signal processing application-specific integrated circuit is configured to perform warping detection, warping correction, color correction, deblurring, or noise reduction, or any combination thereof.

3. The integrated circuit device of claim 1, wherein the image signal processing application-specific integrated circuit comprises an artificial intelligence engine configured to generate, from a first image stream generated by the image sensor, a second image stream; and wherein the camera serial interface is configured to provide the second image stream.

4. The integrated circuit device of claim 3, wherein the artificial intelligence engine is configured to identify portions of images in the first image stream and generate the second image stream by zooming in to the portions.

5. The integrated circuit device of claim 4, wherein the artificial intelligence engine is further configured to identify the portions via object recognition using an artificial neural network.

6. The integrated circuit device of claim 3, wherein the artificial intelligence engine is further configured to generate, from the first image stream, inference results.

7. The integrated circuit device of claim 6, further comprising:
a host interface configured to receive read commands to retrieve the inference results from the dynamic random access memory.

8. The integrated circuit device of claim 7, further comprising:
non-volatile memory configured to store the inference results.

9. The integrated circuit device of claim 6, further comprising:
an interface configured to communicate with an external solid state drive using a non-volatile memory express protocol.

10. The integrated circuit device of claim 9, wherein the external solid state drive includes a black box data recorder of an autonomous vehicle.

11. A solid state drive having an integrated circuit of claim 6, wherein comprising:
non-volatile memory configured to store the inference results; and
a non-volatile memory express interface configured to receive read commands from a host system to retrieve inference results from the non-volatile memory without the host system issuing write commands to write the inference results into the non-volatile memory.

12. The solid state drive of claim 11, having a ball grid array form factor; the solid state drive is a single chip solid state drive; and the solid state drive has a portion of a function of a black box data recorder of an autonomous vehicle.

13. The solid state drive of claim 11 further comprising:
a controller configured to perform garbage collection and wear leveling in the solid state drive.

14. The integrated circuit device of claim 1, wherein the dynamic random access memory is directly accessible to the image signal processing application-specific integrated circuit via the substrate having the interconnect.

15. The integrated circuit device of claim 1, wherein the camera serial interface and the dynamic random access memory are directly connected via the substrate having the interconnect.

16. The integrated circuit device of claim 15, wherein the camera serial interface and the image signal processing application-specific integrated circuit are directly connected via the substrate having the interconnect.

17. An integrated circuit device, comprising:
an image sensor configured to generate a first image stream;
an artificial intelligence engine configured to generate a second image stream from the first image stream;
memory coupled directly between the artificial intelligence engine and the image sensor; and
a camera serial interface configured to provide the second image stream;
wherein the integrated circuit device is configured within an integrated circuit package.

18. The integrated circuit device of claim 17, wherein the artificial intelligence engine is configured to identify portions of images in the first image stream and generate the second image stream by zooming in to the portions.

19. The integrated circuit device of claim 18, wherein the portions are identified via object recognition using an artificial neural network.

20. A solid state drive, comprising:
an image sensor configured to generate an image stream;
an artificial intelligence engine configured to generate inference results from the image stream;
memory coupled directly between the artificial intelligence engine and the image sensor, wherein the memory is configured to store the inference results; and
a non-volatile memory express interface configured to receive read commands from a host system to retrieve inference results from the memory without the host system issuing write commands to write the inference results into the memory;
wherein at least the image sensor and the memory are configured within a same integrated circuit package.

21. The solid state drive of claim 20, having a ball grid array form factor; and the solid state drive is a single chip solid state drive.

22. The solid state drive of claim 20, wherein at least a portion of the memory is non-volatile; and the solid state drive has a portion of a function of a black box data recorder of an autonomous vehicle.

23. The solid state drive of claim 20 further comprising:
a controller configured to perform garbage collection and wear leveling in the solid state drive.

* * * * *